US011032977B2

(12) United States Patent
Smith et al.

(10) Patent No.: US 11,032,977 B2
(45) Date of Patent: Jun. 15, 2021

(54) SYSTEMS AND METHODS FOR MOVING WETTED SEED THROUGH A GROW POD SYSTEM

(71) Applicant: Grow Solutions Tech LLC, Vineyard, UT (US)

(72) Inventors: Jordan Farnsworth Smith, Spanish Fork, UT (US); Charles Thomas Martin, Elk Ridge, UT (US); Joseph David Frodsham, Kaysville, UT (US); David Smith Broadbent, Santaquin, UT (US)

(73) Assignee: GROW SOLUTIONS TECH LLC, Vineyard, UT (US)

( * ) Notice: Subject to any disclaimer, the term of this patent is extended or adjusted under 35 U.S.C. 154(b) by 213 days.

(21) Appl. No.: 16/263,967

(22) Filed: Jan. 31, 2019

(65) Prior Publication Data

US 2020/0236868 A1    Jul. 30, 2020

Related U.S. Application Data

(63) Continuation of application No. PCT/US2019/015889, filed on Jan. 30, 2019.

(51) Int. Cl.
*A01G 9/08* (2006.01)
*A01G 9/24* (2006.01)
(Continued)

(52) U.S. Cl.
CPC ............... *A01G 9/085* (2013.01); *A01G 9/08* (2013.01); *A01G 9/24* (2013.01); *A01G 9/247* (2013.01);
(Continued)

(58) Field of Classification Search
CPC .......... A01G 9/085; A01G 9/247; A01G 9/26; A01G 27/003; A01G 27/005; A01G 27/008; A01G 31/02; A01C 7/004; A01C 1/02
See application file for complete search history.

(56) References Cited

U.S. PATENT DOCUMENTS 2,639,812 A * 5/1953 Guyer ...................... A01C 1/08
                                                                210/167.01
3,993,359 A * 11/1976 Sweeney ................ B65G 53/30
                                                                406/137
(Continued)

FOREIGN PATENT DOCUMENTS

CN         204232041           4/2015
EP         2674019 A1         12/2013
(Continued)

OTHER PUBLICATIONS

Translation of FR 2580519 A3 (Year: 1986).*
International Search Report and Written Opinion of the International Searching Authority, dated Oct. 22, 2019, PCT.

*Primary Examiner* — Christopher D Hutchens
*Assistant Examiner* — Steven J Shur
(74) *Attorney, Agent, or Firm* — Dinsmore & Shohl, LLP

(57) ABSTRACT

A method for pumping seeds to an assembly line grow pods includes releasing seeds to a pipe in fluid communication with a pump, moving water from a water source to the pipe in fluid communication with the pump, combining the seeds released from the tank with the water from the water source in the pipe, and pumping the combination of the seeds released from the tank and the water from the water source to a grow pod line in fluid communication with the pump, and moving the seeds from the grow pod line to one or more carts of an assembly line grow pod.

20 Claims, 13 Drawing Sheets

(51) Int. Cl.
  *A01G 9/26*    (2006.01)
  *A01G 31/02*   (2006.01)
  *A01G 27/00*   (2006.01)

(52) U.S. Cl.
  CPC ............... *A01G 9/26* (2013.01); *A01G 27/00* (2013.01); *A01G 27/003* (2013.01); *A01G 27/005* (2013.01); *A01G 27/008* (2013.01); *A01G 31/02* (2013.01)

(56) References Cited

U.S. PATENT DOCUMENTS

| | | | |
|---|---|---|---|
| 4,258,501 A * | 3/1981 | Brown ................. | A01G 31/047 47/16 |
| 4,660,775 A | 4/1987 | Ostrom et al. | |
| 4,723,710 A * | 2/1988 | Lucore, II .......... | A01M 7/0092 239/124 |
| 4,949,656 A * | 8/1990 | Lyle ..................... | A01C 5/062 111/174 |
| 5,012,974 A * | 5/1991 | Johnson ................ | A01C 7/004 239/1 |
| 6,431,096 B1 * | 8/2002 | Engelke ................ | A01C 7/008 111/127 |
| 10,206,377 B2 * | 2/2019 | Barber ................. | A01K 63/045 |
| 2018/0359936 A1 | 12/2018 | Millar | |
| 2018/0359953 A1 | 12/2018 | Millar et al. | |

FOREIGN PATENT DOCUMENTS

| | | | |
|---|---|---|---|
| FR | 2580519 A3 * | 10/1986 | ............. B65G 53/40 |
| FR | 2580519 A3 | 10/1986 | |
| WO | 2015091605 A2 | 6/2015 | |

* cited by examiner

SYSTEMS AND METHODS FOR MOVING WETTED SEED THROUGH A GROW POD SYSTEM

CROSS-REFERENCE TO RELATED APPLICATIONS

This application is a continuation of International Patent Application PCT/US2019/15889, filed Jan. 30, 2019 and entitled "SYSTEMS AND METHODS FOR MOVING WETTED SEED THROUGH A GROW POD SYSTEM," which is hereby incorporated by reference in its entirety.

TECHNICAL FIELD

Embodiments described herein generally relate to systems and methods for germinating seeds and, more specifically, to systems and methods for moving wetted seed through a grow pod system.

BACKGROUND

While crop growth technologies have advanced over the years, there are still many problems in the farming and crop industry. As an example, while technological advances have increased efficiency and production of various crops, many factors may affect a harvest, such as weather, disease, infestation, and the like. Additionally, while the United States currently has suitable farmland to adequately provide food for its population, other countries and future populations may not have enough farmland to provide the appropriate amount of food.

Controlled environment growing systems may mitigate the factors affecting traditional harvests. However, the germination process in conventional controlled environment growing systems may be time consuming and may reduce the efficiency of conventional controlled environment growing systems. Accordingly, a need exists for improved germination systems for use with controlled environment growing systems.

SUMMARY

In one embodiment, a method for pumping seeds to an assembly line grow pod includes releasing seeds to a pipe in fluid communication with a pump, moving water from a water source to the pipe in fluid communication with the pump, combining the seeds released from the tank with the water from the water source in the pipe, and pumping the combination of the seeds released from the tank and the water from the water source to a grow pod line in fluid communication with the pump, and moving the seeds from the grow pod line to one or more carts of an assembly line grow pod.

In another embodiment, a method for moving germinated seeds to an assembly line grow pod includes germinating seeds within a tank, releasing the seeds from the tank to a pipe in fluid communication with the tank and in fluid communication with a pump, moving water from a water source to the pipe in fluid communication with the pump, combining the seeds released from the tank with the water from the water source in the pipe, pumping the combination of the seeds released from the tank and the water from the water source to a grow pod line in fluid communication with the pump, and moving the seeds from the grow pod line to one or more carts of an assembly line grow pod.

In yet another embodiment, a system for an assembly line grow pod includes a germination hub including a tank, a tank water valve in fluid communication with the tank, where the tank water valve is repositionable between a closed position and an open position, a water source in selective fluid communication with the tank through the tank water valve, a pump in selective fluid communication with the tank and the water source, a water source valve positioned between the pump and the water source, where the water source valve is repositionable between an open position and a closed position, and a tank outlet valve positioned between the tank and the pump, where the tank outlet valve is repositionable between an open position and a closed position, a pod line in selective fluid communication with the germination hub, and a controller communicatively coupled to the tank water valve, the pump, the water source valve, and the tank outlet valve, the controller including a processor and a computer readable and executable instruction set, which when executed, causes the processor to direct the tank water valve to move from the closed position to the open position, direct the pump to move water from the water source to the tank through the tank water valve, wetting a first batch of seeds within the tank with the water from the water source, initiating germination of the first batch of seeds, after a predetermined time, direct the tank outlet valve to move from the closed position to the open position, releasing the first batch of seeds from the tank to the pump, direct the water source valve to move from the closed position, releasing water from the water source to the pump, and direct the pump to move the first batch of seeds to the pod line and the water from the water source to the pod line.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
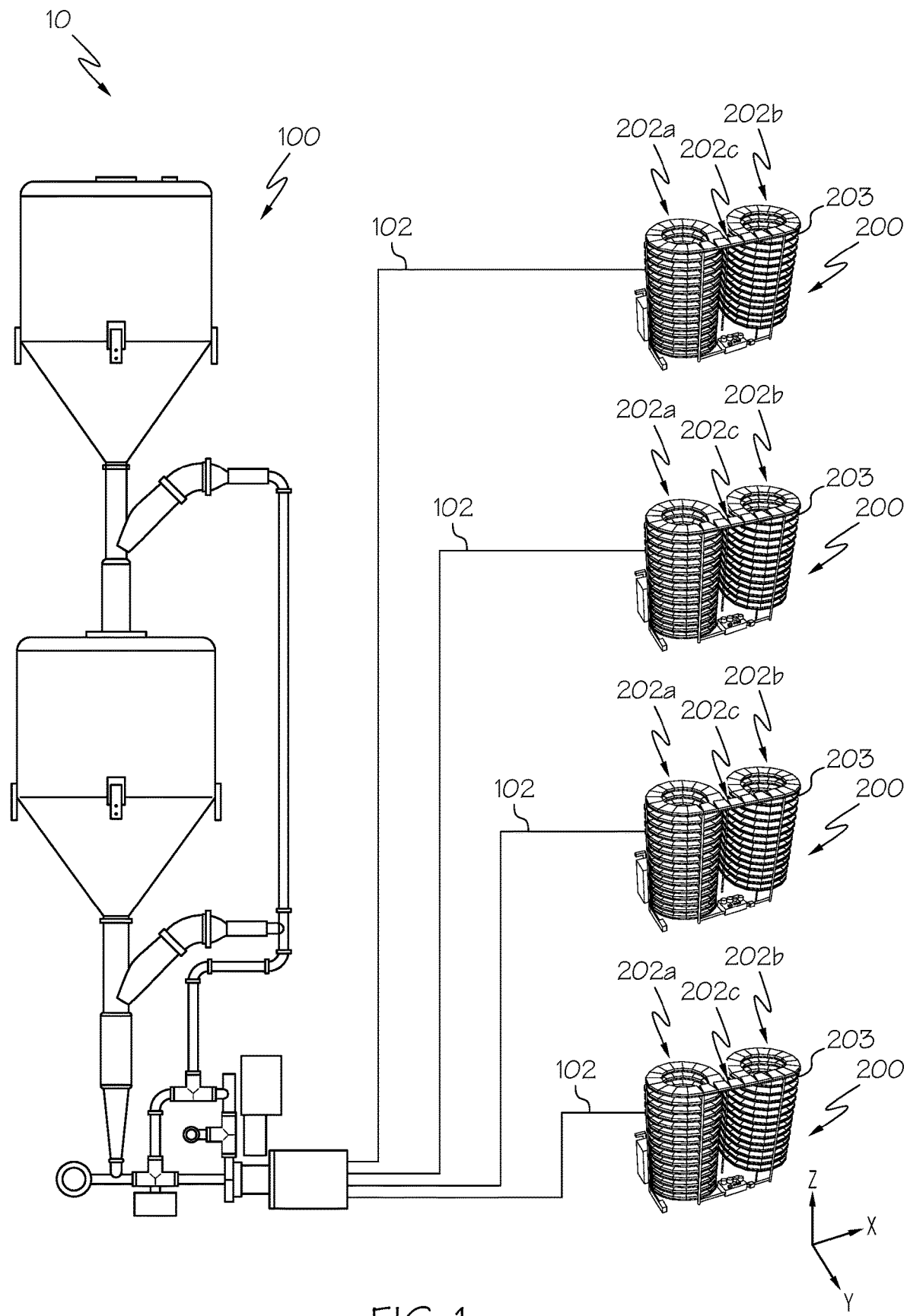
FIG. 1 schematically depicts a germination hub in communication with multiple assembly line grow pods, according to one or more embodiments shown and described herein.

Embodiments disclosed herein are directed to germination systems for assembly line grow pods. In particular, the germination process in conventional controlled environment growing systems may be time consuming and may reduce the efficiency of conventional controlled environment growing systems. Embodiments described herein are directed to methods and systems for germinating seeds for use within multiple assembly line grow pods. Reference will now be made in detail to embodiments of methods and systems for germinating seeds, examples of which are illustrated in the accompanying drawings. Whenever possible, the same reference numerals will be used throughout the drawings to refer to the same or like parts.

As used herein, the term "longitudinal direction" refers to the forward-rearward direction of components of the grow pod system (i.e., in the +/−Y-direction depicted in FIG. 1). The term "lateral direction" refers to the cross-wise direction of components of the grow pod system (i.e., in the +/−X-direction depicted in FIG. 1), and is transverse to the longitudinal direction. The term "vertical direction" refers to the upward-downward direction of components of the grow pod system (i.e., in the +/−Z-direction depicted in FIG. 1).

Referring initially to FIG. 1, a grow pod system 10 is schematically depicted. The grow pod system 10 generally includes a germination hub 100 in fluid communication with one or more assembly line grow pods 200. More particularly, the germination hub 100 may be connected to the one or more assembly line grow pods 200 via one or more associated pod lines 102. As described in greater detail herein, germinated seeds may be moved from the germination hub 100 to the one or more assembly line grow pods 200 through the pod lines 102. While the embodiment depicted in FIG. 1 shows the germination hub 100 connected to four assembly line grow pods 200, it should be understood that the germination hub 100 may be connected to any suitable number of assembly line grow pods 200 and may, in some embodiments, be connected to a single assembly line grow pod 200.

Figure 2:
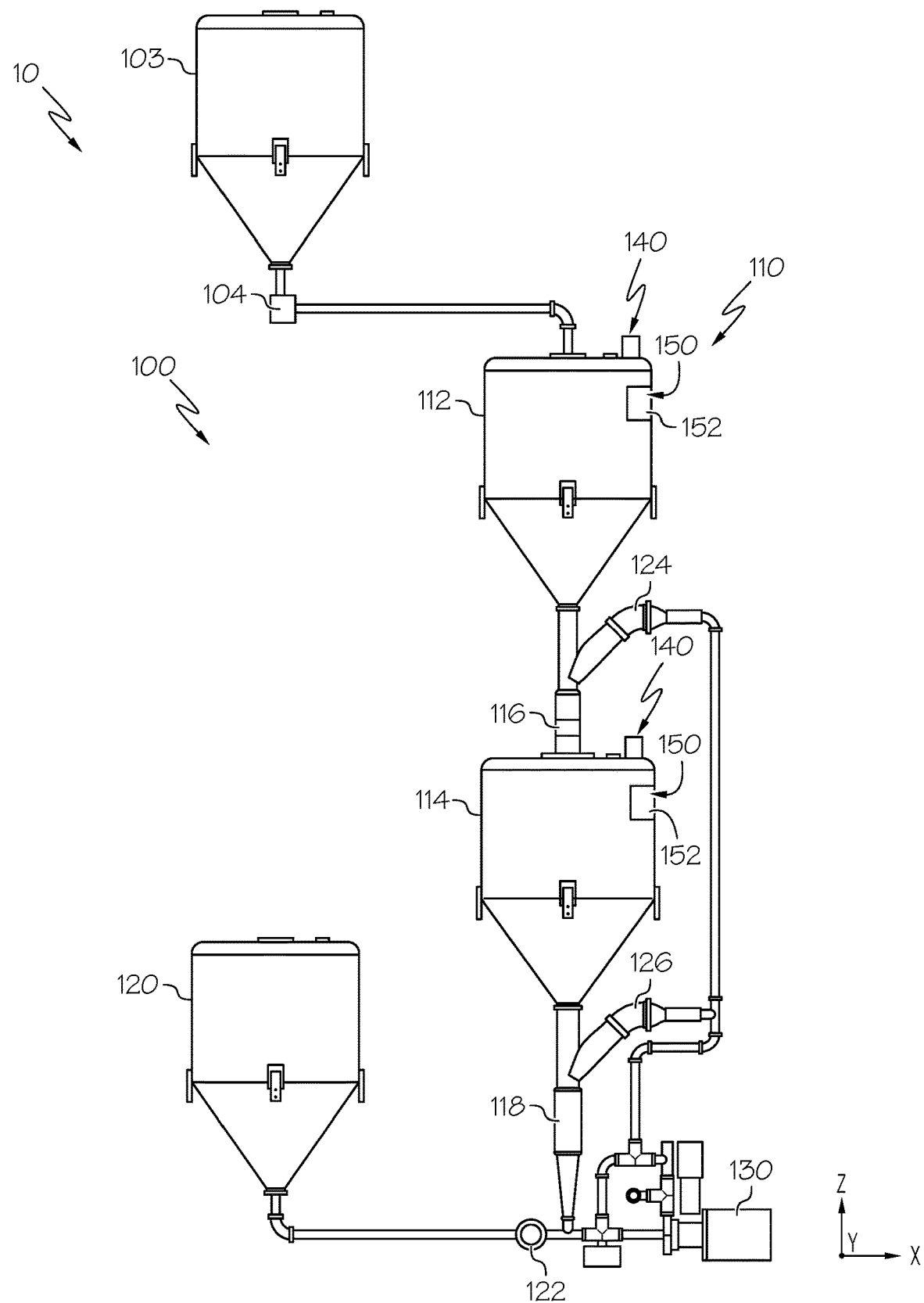
FIG. 2 schematically depicts an enlarged view of the germination hub of FIG. 1, according to one or more embodiments shown and described herein.

In embodiments, each assembly line grow pod 200 may a track 203 that is configured to allow one or more carts to travel along the track 203. In the embodiment depicted in FIG. 1, each of the assembly line grow pods 200 includes an ascending portion 202a, a descending portion 202b, and a connection portion 202c positioned between the ascending portion 202a and the descending portion 202b. The track 203 at the ascending portion 202a moves upward in a vertical direction (i.e., in the +Z-direction as depicted in the coordinate axes of FIG. 1), such that carts moving along the track 203 move upward in the vertical direction as they travel along the ascending portion 202a. The track 203 at the ascending portion 202a may include curvature as depicted in FIG. 2, and may wrap around a first axis that is generally parallel to the Z-axis depicted in the coordinate axes of FIG. 1, forming a spiral shape around the first axis. The connection portion 202c is positioned between the ascending portion 202a and the descending portion 202b, and may be relatively level as compared to the ascending portion 202a and the descending portion 202b, such that the track 203 generally does not move upward or downward in the vertical direction at the connection portion 202c. The track 203 at the descending portion 202b moves downward in the vertical direction (i.e., in the −Z-direction as depicted in the coordinate axes of FIG. 1), such that carts moving along the track 203 move downward in the vertical direction as they travel along descending portion 202b. The track 203 at the descending portion 202b may be curved, and may wrap around a second axis that is generally parallel to the Z-axis depicted in the coordinate axes of FIG. 1, forming a spiral shape around the second axis. In some embodiments, such as the embodiment shown in FIG. 1, the ascending portion 202a and the descending portion 202b may generally form symmetric shapes and may be mirror-images of one another. In other embodiments, the ascending portion 202a and the descending portion 202b may include different shapes that ascend and descend in the vertical direction, respectively. The ascending portion 202a and the descending portion 202b may allow the track 203 to extend a relatively long distance while occupying a comparatively small footprint evaluated in the Y-direction and the X-direction as depicted in the coordinate axes of FIG. 1, as compared to assembly line grow pods that do not include an ascending portion 202a and a descending portion 202b. Minimizing the footprint of the assembly line grow pod 200 may be advantageous in certain applications, such as when the assembly line grow pod 200 is positioned in a crowded urban center or in other locations in which space is limited.

Referring to FIG. 2, an enlarged view of the germination hub 100 is schematically depicted. In embodiments, the grow pod system 10 includes a seed silo 103 in selective fluid communication with the germination hub 100, and a water source 120 in selective fluid communication with the germination hub 100. More particularly, in the embodiment depicted in FIG. 2, the seed silo 103 is in selective fluid communication with the germination hub 100 via a silo valve 104 positioned between the seed silo 103 and the germination hub 100. The silo valve 104 is repositionable between an open position, in which the seed silo 103 is in fluid communication with the germination hub 100, and a closed position, in which the seed silo 103 is not in fluid communication with the germination hub 100. In operation, dry seeds may be positioned within the seed silo 103, and the dry seeds may be moved to the one or more tanks 110 of the germination hub 100 for germination, as described in greater detail herein. While a single seed silo 103 is depicted in FIG. 2, it should be understood that multiple seed silos may be in selective fluid communication with the germination hub 100. For example, in some embodiments, different types of seeds may be germinated within the same germination hub 100, and different seed silos may hold different types of dry seeds to be provided to the germination hub 100. Furthermore, in some embodiments, the germination hub 100 may include a silo in selective fluid communication with the secondary tank 114. For example, some seeds may require a comparatively short germination time, and may accordingly be introduced to the germination hub at the secondary tank 114 without initially being germinated in the initial tank 112.

In the embodiment depicted in FIG. 2, the water source 120 includes a reservoir configured to hold a volume of water. In some embodiments, water source 120 may be an external water line, such as a municipal water line, and/or may be a reservoir in fluid communication with an external water line. In embodiments, the water source 120 is in selective fluid communication with the one or more tanks 110. More particularly, in the embodiment depicted in FIG. 2, the water source 120 is in fluid communication with the one or more tanks 110 via a water source valve 122 positioned between the water source 120 and the one or more tanks 110. The water source valve 122 is repositionable between an open position, in which the water source 120 is in fluid communication with the germination hub 100, and a closed position, in which the water source 120 is not in fluid communication with the germination hub 100.

In embodiments, the germination hub 100 includes a pump 130 in selective fluid communication with the one or more tanks 110 and the water source 120. In embodiments, the pump 130 may generally include a pump suitable for moving water and/or seeds, as described in greater detail herein. More particularly, the pump 130 may include a centrifugal pump, a diaphragm pump, a gear pump, a peristaltic pump, a lobe pump, a piston pump, or the like.

In the embodiment depicted in FIG. 2, the one or more tanks 110 includes an initial tank 112 and a secondary tank 114 in selective fluid communication with the in initial tank 112. In the embodiment depicted in FIG. 2, the initial tank 112 is positioned above the secondary tank 114 in the vertical direction. The initial tank 112 and the secondary tank 114 are generally configured to hold seeds and water, and may be formed of a material suitable for holding seed and water, such as stainless steel or the like. As described in greater detail herein, seeds may be germinated in the initial tank 112 and the secondary tank 114, and more particularly, a batch of seeds may start germinating in the initial tank 112, and may subsequently be moved to the secondary tank 114 to continue germinating. By separating the germination process between discrete tanks, variation in the germination of seeds in the batch may be minimized. For example and without being bound by theory, germination may initiate once water contacts a seed, and tanks holding comparatively large volumes of seeds, it may be impractical for water to simultaneously contact all of the seeds as water is introduced into the tank. Instead, water will generally contact the seeds closest to the one or more locations where water is introduced to the tank, and will subsequently contact the rest of the seeds in the batch as the tank is filled with water. In comparatively large tanks, the time between when water contacts a first seed of the batch and contact the last seed of the batch may be significant, leading to significant differences in the progress of germination of the seeds within the batch. By contrast, by utilizing comparatively small tanks connected to one another (e.g., the initial tank 112 and the secondary tank 114) the germination hub 100 may continuously germinate seeds without incurring significant variation in the germination of the seeds.

The germination hub 100 includes a tank outlet valve 116 positioned between the initial tank 112 and the secondary tank 114, and a tank outlet valve 118 positioned below the secondary tank 114. In embodiments, the tank outlet valve 116 between the initial tank 112 and the secondary tank 114 selectively connects the initial tank 112 to the secondary tank 114. More particularly, the tank outlet valve 116 is repositionable between an open position, in which the initial tank 112 and the secondary tank 114 are in fluid communication with one another, and a closed position, in which the initial tank 112 and the secondary tank 114 are not in fluid communication with one another. Similarly, the tank outlet valve 118 connected to the secondary tank 114 selectively connects the secondary tank 114 to a pipe in fluid communication with the pump 130. More particularly, the tank outlet valve 118 is repositionable between an open position, in which the secondary tank 114 is in fluid communication with the pump 130, and a closed position, in which the secondary tank 114 is not in fluid communication with the pump 130. By selectively moving the tank outlet valve 118 between the closed position and the open position, the tank outlet valve 118 may selectively release seeds from the secondary tank 114, as described in greater detail herein.

In embodiments, the initial tank 112 and the secondary tank 114 are in selective fluid communication with the pump 130 and the water source 120 through tank water valves 124, 126, respectively. The tank water valve 124 is repositionable between an open position, in which the initial tank 112 is in fluid communication with the pump 130 and the water source 120, and a closed position, in which the initial tank 112 is not in fluid communication with the pump 130 and the water source 120. Similarly, the tank water valve 126 is repositionable between an open position, in which the secondary tank 114 is in fluid communication with the pump 130 and the water source 120, and a closed position, in which the secondary tank 114 is not in fluid communication with the pump 130 and the water source 120. By repositioning the tank water valves 124, 126 between the open and closed positions and through activation of the pump 130, water may be directed to the initial and secondary tanks 112, 114, and water may be drained from the initial and secondary tanks 112, 114, as described in greater detail herein. In embodiments, filters or screens may be positioned between the initial and secondary tanks 112, 114 and the tank water valves 124, 126 to prevent seed from passing through the tank water valves 124, 126.

In embodiments, the tank water valves 124, 126 are positioned at a lower portion of the initial tank 112 and the secondary tank 114, such that water directed to the initial tank 112 and the secondary tank 114 is introduced at the lower portion of the initial tank 112 and the secondary tank 114. As water is introduced to the initial tank 112 and the secondary tank 114 through the tank water valves 124, 126, respectively, the water moves the seeds upward in the vertical direction. For example and without being bound by theory, seeds may generally be buoyant and may move upward in the vertical direction as water is introduced through the lower portion of the initial tank 112 and the secondary tank 114. The seeds may move upward as a result of hydrostatic forces acting on the seeds as the water level within the initial tank 112 and the secondary tank 114 increases. By introducing water to the seed through the lower portion of the initial tank 112 and the secondary tank 114, the rising water may mix and agitate the seeds, reducing the clumping of seeds together and/or clumping of seed on sides of the initial tank 112 and the secondary tank 114, as compared to configurations in which water is introduced from the top of the tanks.

Still referring to FIG. 2, in some embodiments, the germination hub 100 may further include at least one tank level sensor 140. In the embodiment depicted in FIG. 2, the germination hub 100 includes a tank level sensor 140 configured to detect a level of material within the initial tank 112, and another tank level sensor 140 configured to detect a level of material within the secondary tank 114. For example, in the embodiment depicted in FIG. 2, a tank level sensor 140 is engaged with the initial tank 112 and is configured to detect a level of water and/or seed positioned within the initial tank 112, and another tank level sensor 140 is engaged with the secondary tank 114 and configured to detect a level of water and/or seed positioned within the secondary tank 114. In embodiments, the tank level sensors 140 may include any suitable sensor to detect the level of water and/or seed within the initial tank 112 and the secondary tank 114, for example and without limitation, ultrasonic sensors, laser sensors, continuous float level sensors, or the like.

In embodiments, the germination hub 100 further includes one or more agitation devices 150. In the embodiment depicted in FIG. 2, the germination hub 100 includes an agitation device 150 engaged with the initial tank 112, and another agitation device 150 engaged with the secondary tank 114. The one or more agitation devices 150 include devices that are positionable in an activated state, in which the agitation device 150 agitates seeds positioned within the tanks 112, 114, and a deactivated state, in which the agitation device 150 is at rest. For example, in the embodiment depicted in FIG. 2, the one or more agitation devices 150 includes a vibration device 152 coupled to the initial tank 112, and a vibration device 152 coupled to the secondary tank 114. In the activated state, the vibration device 152 coupled to the initial tank 112 vibrates the initial tank 112, and the vibration device 152 coupled to the secondary tank 114 vibrates the secondary tank 114 in the activated state. By vibrating the initial tank 112 and/or the secondary tank 114, the vibration devices 152 may assist in agitating seeds positioned within the initial tank 112 and/or the secondary tank 114. By agitating the seeds positioned within the initial tank 112 and/or the secondary tank 114, the vibration devices 152 may assist in moving seeds out of the initial tank 112 and/or the secondary tank 114, as described in greater detail herein.

Figure 3:
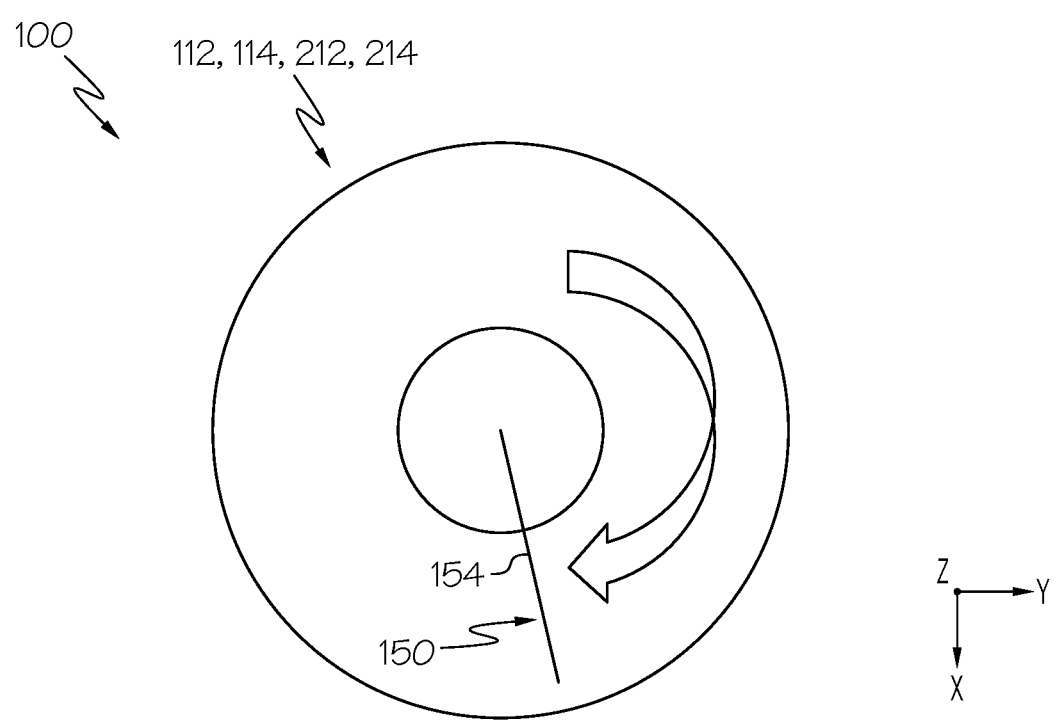
FIG. 3 schematically depicts a top view of a tank of the germination hub of FIG. 1, according to one or more embodiments shown and described herein.

Referring to FIG. 3, an example top view of the initial tank 112 is schematically depicted. While reference is made herein to the initial tank 112, it should be understood that secondary tank 114 may include a substantially similar construction. In some embodiments, the agitation device 150 includes an engagement member 154 positioned within the initial tank 112 and/or the secondary tank 114. For example, in some embodiments, the engagement member 154 moves within the initial tank 112 and/or the secondary tank 114 in the activated state. More particularly, the engagement member 154 may include a paddle that rotates about a center of the initial tank 112 and/or the secondary tank 114 in the activated state. By rotating about the center of the initial tank 112 and/or the secondary tank 114, the engagement member 154 may assist in moving seeds out of the initial tank 112 and/or the secondary tank 114, as described in greater detail herein.

Figure 4:
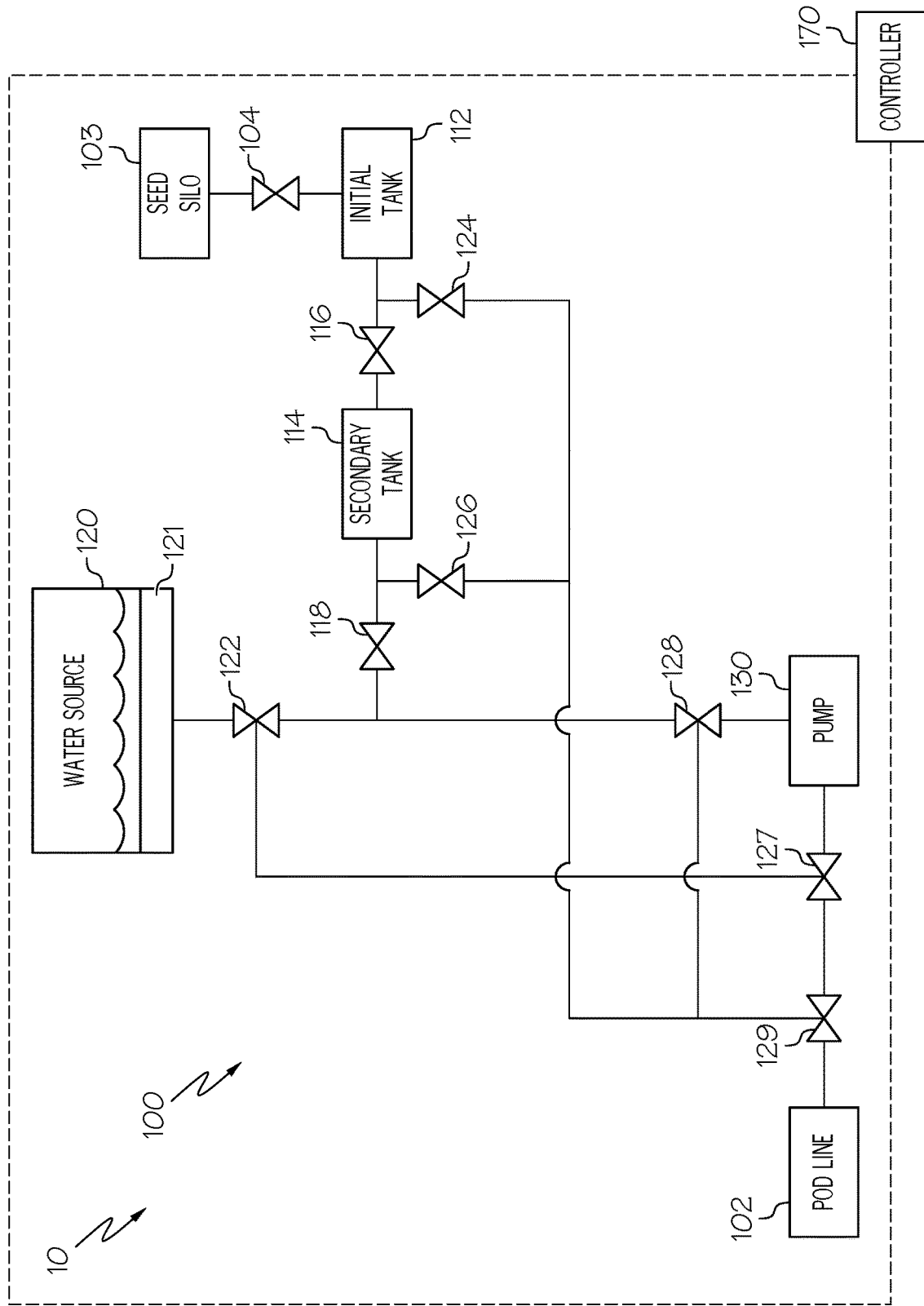
FIG. 4 schematically depicts a valve diagram of the germination hub of FIG. 1, according to one or more embodiments shown and described herein.

Referring to FIG. 4, a schematic valve control diagram of the germination hub 100 is schematically depicted. As described above, the germination hub 100 includes a tank outlet valve 116 positioned between the initial tank 112, and a tank outlet valve 118 positioned below the secondary tank 114. The germination hub 100 further includes the tank water valve 126 that selectively connects the secondary tank 114 to the water source 120 and the pump 130, and the tank water valve 124 that selectively connects the initial tank 112 to the water source 120 and the pump 130. Furthermore, the water source 120 is shown in selective fluid communication with the initial tank 112, the secondary tank 114, and the pump 130 via the water source valve 122. As noted above, the grow pod system 10 further includes the seed silo 103 that is in selective fluid communication with the germination hub 100 via the silo valve 104.

In embodiments, the germination hub 100 further includes a pump inlet valve 128, and a pump outlet valve 127 that are in fluid communication with the pump 130. The pump inlet valve 128 is repositionable between an open position, in which water and/or seeds may flow into the pump 130 through the pump inlet valve 128, and a closed position, in which water and/or seeds are restricted from flowing into the pump 130 through the pump inlet valve 128. The pump outlet valve 127 may selectively direct water and/or seeds from the pump 130 to the pod line 102, and may selectively direct water from the pump 130 to the water source 120. In the embodiment depicted in FIG. 4, the germination hub 100 further includes a pod line valve 129 that selectively directs water and/or seeds from the pump 130 to the pod line 102, and may selectively direct water from the pump 130 to the initial tank 112 and/or the secondary tank 114.

In embodiments, the grow pod system 10 further includes a controller 170 that is communicatively coupled to the pump 130, the pod line valve 129, the pump outlet valve 127, the pump inlet valve 128, the tank water valves 124, 126, the water source valve 122, and the silo valve 104. As described in greater detail herein, the controller 170 may selectively direct the pump 130, the pod line valve 129, the pump outlet valve 127, the pump inlet valve 128, the tank water valves 124, 126, the water source valve 122, and the silo valve 104 to move water and seeds through the germination hub 100.

Figure 5:
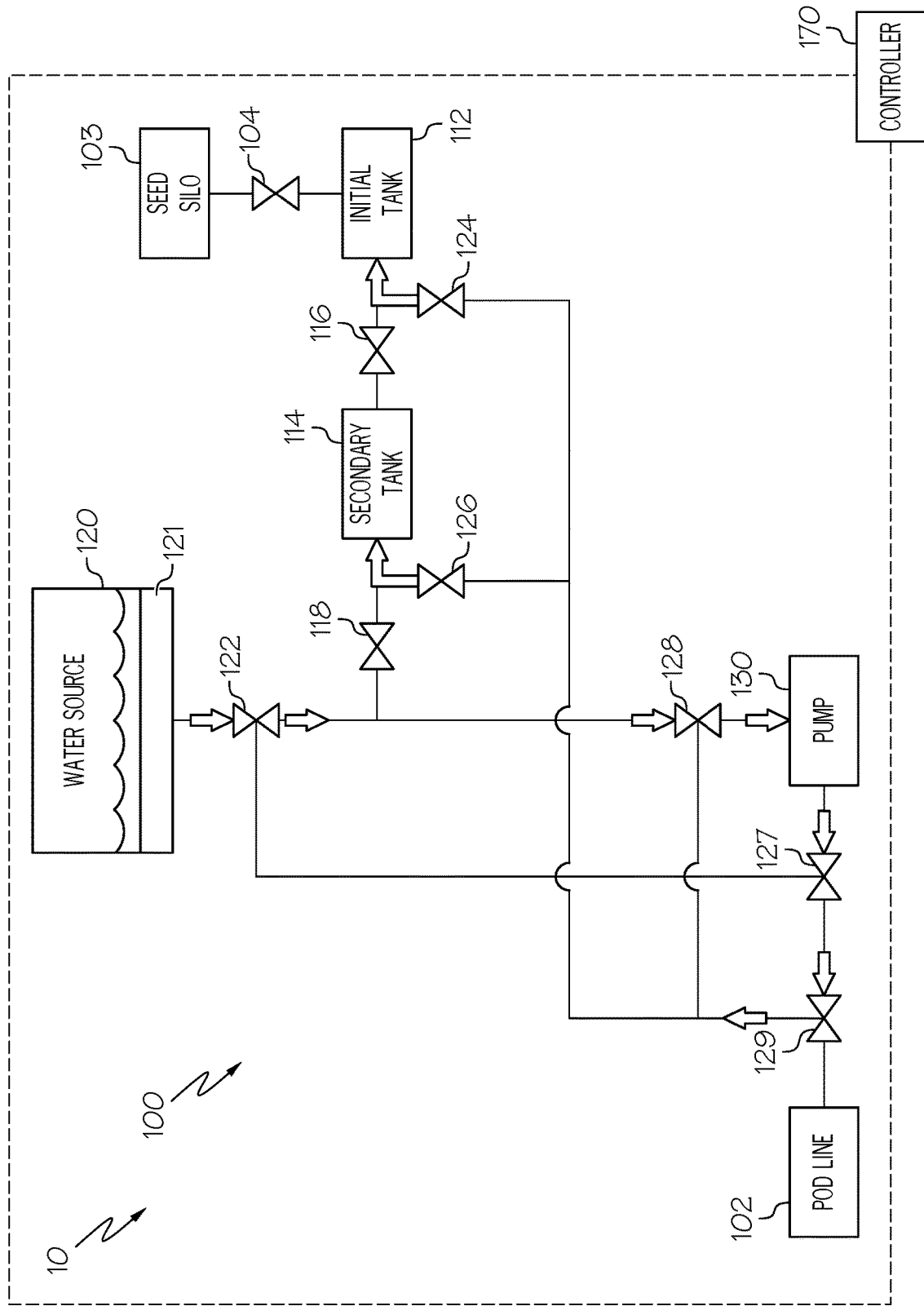
FIG. 5 schematically depicts the valve diagram of FIG. 4 moving water to an initial tank and a secondary tank of the germination hub, according to one or more embodiments shown and described herein.

For example and referring to FIG. 5, a valve diagram of the grow pod system 10 is depicted showing water being pumped to the initial tank 112 and the secondary tank 114. Initially, a batch of seeds may be positioned in the initial tank 112. More particularly, the controller 170 may direct the silo valve 104 to move from the closed position to the open position, releasing dry seed from the seed silo 103 to the initial tank 112, thereby positioning the batch of seeds within the initial tank 112. In embodiments, batches of seeds may initially be deposited in the initial tank 112 and may then be moved to the secondary tank 114, as described in greater detail herein. Upon moving a batch of seeds from the initial tank 112 to the secondary tank 114, another batch of dry seeds may be released from the seed silo 103 for germination.

Water from the water source 120 may be directed to the initial tank 112 to wet the batch of seeds within the initial tank 112 and to initiate germination of the batch of seeds. In some embodiments, the water from the water source 120 is directed to the initial tank 112 after the batch of seeds are positioned within the initial tank 112. In some embodiments, water from the water source 120 is directed to the initial tank 112 prior to the positioning of the batch of seeds within the initial tank 112.

To direct water from the water source 120 to the initial tank 112, the controller 170 directs the water source valve 122 and the pump inlet valve 128 to reposition from the closed position to the open position. With the water source valve 122 and the pump inlet valve 128 in the open position, the water source 120 is in fluid communication with the pump 130.

The controller 170 further directs the pump 130 to move water from the water source 120. The controller 170 further directs the pump outlet valve 127 and the pod line valve 129 to direct water moved by the pump 130 to the initial tank 112 and the secondary tank 114. The controller 170 further directs the tank water valve 124 to reposition from the closed position to the open position, such that water from the water source 120 is pumped by the pump 130 to the initial tank 112. In some embodiments, such as embodiments in which it is desirable to direct water to the secondary tank 114 (either alone or simultaneously with the direction of water to the initial tank 112), the controller 170 directs the tank water valve 126 to reposition from the closed position to the open position, such that water from the water source 120 is pumped by the pump 130 to the secondary tank 114.

In embodiments, the initial tank 112 and/or the secondary tank 114 may be filled with water until a desired amount of water is positioned within the initial tank 112 and the secondary tank 114. In some embodiments, the controller 170 is communicatively coupled to the tank level sensors 140 (FIG. 2), which send signals to the controller 170 indicative of the level of water and/or seeds positioned within the initial tank 112 and the secondary tank 114. Without being bound by theory, to initiate the germination process of the batch of seeds positioned within the initial tank 112, it is desirable to submerge the seeds within the initial tank 112 under water. Likewise, to continue a germination process of seeds positioned within the secondary tank 114, it is desirable to submerge the seeds within the secondary tank 114. Accordingly, in embodiments, the pump 130 may continue to pump water from the water source 120 to the initial tank 112 until the tank level sensor 140 (FIG. 2) associated with the initial tank 112 detects a level of water and seeds within the initial tank 112 that indicates the batch of seeds is submerged. Likewise, the pump 130 may continue to pump water from the water source 120 to the secondary tank 114 until the tank level sensor 140 (FIG. 2) associated with the secondary tank 114 detects a level of water and seeds within the secondary tank 114 that indicates the batch of seeds is submerged.

Once the tank level sensor 140 (FIG. 2) associated with the initial tank 112 detects a level of water and seeds within the initial tank 112 that indicates the batch of seeds is submerged, the controller 170 may direct the tank water valve 124 associated with the initial tank 112 to reposition to the closed position to restrict the flow of more water to the initial tank 112. Similarly, once the tank level sensor 140 (FIG. 2) associated with the secondary tank 114 detect a level of water and seeds within the secondary tank 114 that indicates that seeds within the secondary tank 114 are submerged, the controller 170 may direct the tank water valve 126 to reposition to the closed position to restrict the flow of more water to the secondary tank 114. Once the tank level sensors 140 (FIG. 2) associated with both the initial tank 112 and the secondary tank 114 detect a level of water and seeds within the initial tank 112 and the secondary tank 114 indicating that the seeds within the initial tank 112 and the secondary tank 114 are submerged, the controller 170 directs the pump 130 to cease pumping and directs the water source valve 122 to close.

The batch of seeds may remain submerged within the initial tank 112 for a predetermined submersion time. As the batch of seeds is submerged in water, the batch of seeds undergoes a germination process. It is generally desirable in the germination process to drain the water submerging the batch of seeds, such that the seeds may dry and be exposed to oxygen to continue the germination process.

Figure 6:
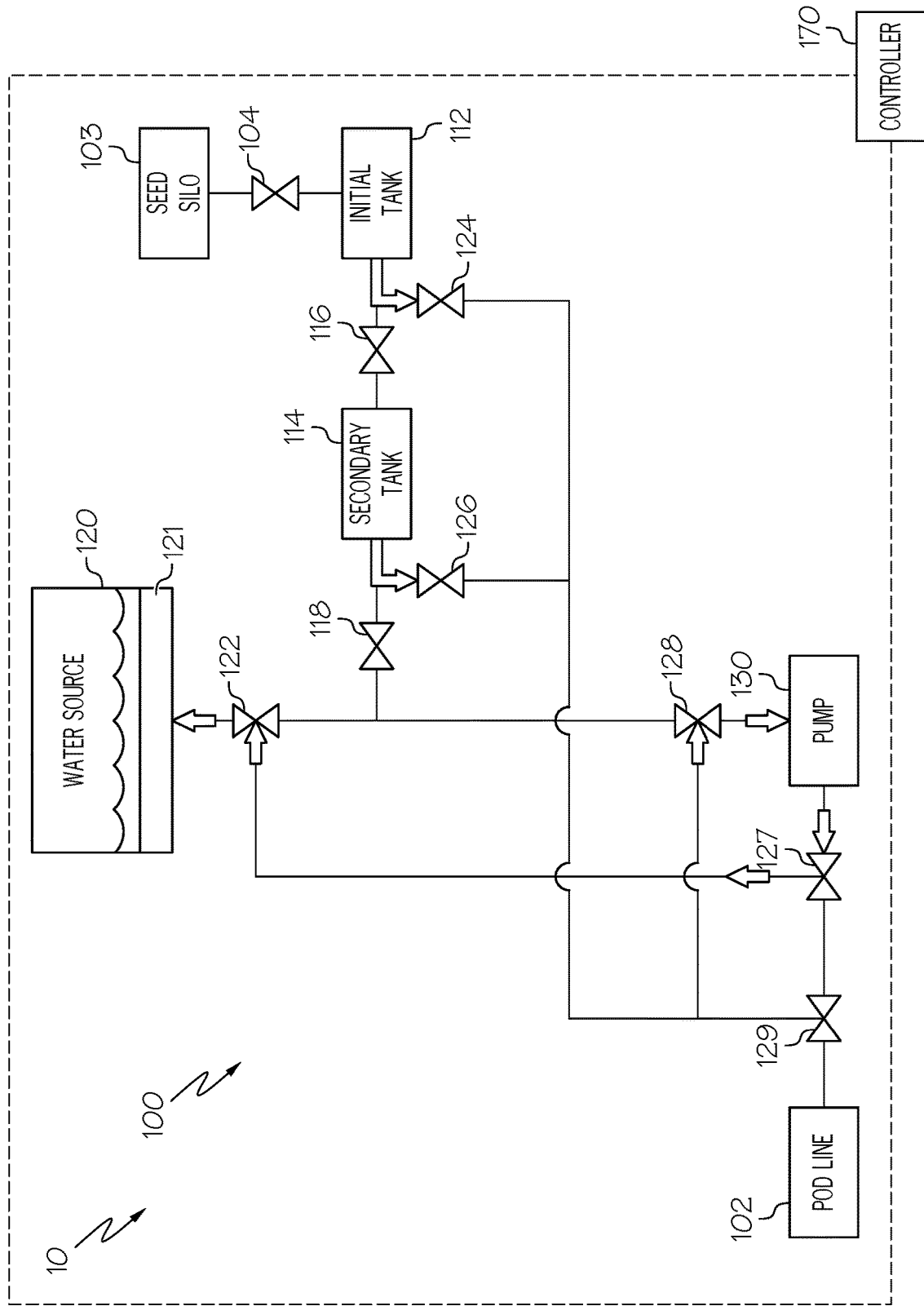
FIG. 6 schematically depicts the valve diagram of FIG. 4 draining water from the initial tank and the secondary tank of the germination hub, according to one or more embodiments shown and described herein.

Referring to FIG. 6, to drain water from the initial tank 112 and/or the secondary tank 114, the controller 170 directs the tank water valve 124 associated with the initial tank 112 to reposition from the closed position to the open position. The controller 170 may further direct the tank water valve 126 associated with the secondary tank 114 to reposition from the closed position to the open position.

The controller 170 further directs the pod line valve 129 to direct water drained from the initial tank 112 and the secondary tank 114 to the pump inlet valve 128, and the controller 170 directs the pump inlet valve 128 to reposition from the closed position to the open position. With the pump inlet valve 128 in the open position, water drained from the initial tank 112 and the secondary tank 114 moves through the tank water valve 124 and the tank water valve 126, respectively, through the pump inlet valve 128, to the pump 130.

The controller 170 directs the pump 130 to pump the water drained from the initial tank 112 and the secondary tank 114 back to the water source 120. More particularly, the controller 170 directs the water source valve 122 to reposition from the closed position to the open position, and the pump 130 moves water drained from the initial tank 112 and the secondary tank 114 to the water source 120. In some embodiments, the water source 120 includes a filter 121 that filters water returning to the water source 120 from the initial tank 112 and the secondary tank 114. The filter 121 may include one or more particulate filters, such as screens or the like, that prevent particulate matter from flowing into the water source 120 from the initial tank 112 and the secondary tank 114. In some embodiments, the filter 121 may include components that reduce waterborne microorganisms in the water returning to the water source 120, such as an ultraviolet (UV) filter or the like.

In embodiments, the pump 130 may continue to pump water from the initial tank 112 and the secondary tank 114 until substantially all of the water in the initial tank 112 and the secondary tank 114 are pumped out of the initial tank 112 and the secondary tank 114. In some embodiments, the pump 130 includes one or more devices that detect the output of the pump 130, and the controller 170 may determine that substantially all of the water in the initial tank 112 and the secondary tank 114 has been pumped out by detecting a decreased output of the pump 130. For example, in some embodiments, the pump 130 may be driven by an electric motor including or communicatively coupled to a variable frequency drive (VFD). In these embodiments, the VFD may detect power drawn by the pump 130, which generally corresponds to water and/or seeds pumped by the pump 130. When draining water from the initial tank 112 and the secondary tank 114, when the power drawn by the pump 130 drops below a predetermined power value, the controller 170 may determine that substantially all of the water has been pumped out of the initial tank 112 and the secondary tank 114.

Upon determining that substantially all of the water has been pumped out of the initial tank 112 and the secondary tank 114, in embodiments, the controller 170 directs the pump 130 to cease pumping. The controller 170 further directs the tank water valves 124, 126 to reposition from the open position to the closed position, and directs the water source valve 122 to move from the open position to the closed position.

With the water drained from the initial tank 112 and the secondary tank 114, the batch of seeds residing in the initial tank 112 may remain for a predetermined breathing time. After the predetermined breathing time, water from the water source 120 may again be directed to the initial tank 112 and/or the secondary tank 114 to wet the batch of seeds, as described above with respect to FIG. 6.

In embodiments, water may be selectively directed to and pumped out of the initial tank 112 as described above to wet the batch of seeds and allow the batch of seeds to breathe. After a predetermined initial time, the batch of seeds within the initial tank 112 are moved to the secondary tank 114 to continue germinating, and another batch of dry seeds are positioned in the initial tank 112 to begin the germination process.

In particular and referring to FIGS. 2 and 4, after the predetermined initial time, the controller 170 directs the tank outlet valve 116 positioned between the initial tank 112 and the secondary tank 114 to reposition from the closed position to the open position such that the initial tank 112 and the secondary tank 114 are in fluid communication with one another. In embodiments, the initial tank 112 is positioned above the secondary tank 114 in the vertical direction, such that the batch of seeds within the initial tank 112 may move to the secondary tank 114 under the force of gravity.

In embodiments, the tank level sensor 140 associated with the initial tank 112 may confirm that substantially all of the seed positioned in the initial tank 112 successfully move to the secondary tank 114. More particularly, in embodiments, the tank level sensor 140 associated with the initial tank 112 sends a signal to the controller 170 indicative of a level of seeds remaining in the initial tank 112. The controller 170 may then determine whether the received signal from the tank level sensor 140 indicates a level of seeds remaining in the initial tank 112 is greater than a predetermined threshold. In some embodiments, the predetermined threshold represents a volume of seeds remaining in the tank. For example, the predetermined threshold may be about 19 liters of seeds remaining in the initial tank 112. In some embodiments, the predetermined threshold may be selected to be a percentage of the seeds initially positioned in the initial tank 112. For example, in some embodiments, the predetermined threshold may be 15% of batch of seeds initially positioned in the initial tank 112.

Upon determining that the level of seeds remaining in the initial tank 112 is greater than the predetermined threshold, the controller 170 may direct the pump 130 to move water from the water source 120 to the initial tank 112, as described above with respect to FIG. 5. The water from the water source 120 may act to dislodge seeds within the initial tank 112, such that the seeds may move to the secondary tank 114.

In some embodiments, in response to determining that the level of seeds remaining in the initial tank 112 is greater than the predetermined threshold, the controller 170 may direct the agitation device 150 coupled to the initial tank 112 to activate. In embodiments in which the agitation device 150 includes the vibration device 152, the agitation device 150 vibrates the initial tank 112 when activated. In embodiments in which the agitation device 150 includes the engagement member 154 (FIG. 3) including the paddle positioned within the initial tank 112, the controller 170 directs the engagement member 154 to rotate within the initial tank 112 to dislodge the remaining seeds in the initial tank 112.

After directing water to the initial tank 112 to dislodge seeds within the initial tank 112 and/or after activating the agitation device 150, the tank level sensor 140 associated with the initial tank 112 may again detect the level of seeds remaining in the initial tank 112, and sends a second signal to the controller 170 indicative of the level of seeds remaining in the initial tank 112. In embodiments, the controller 170 determines whether the second signal from the tank level sensor 140 indicates that the level of seeds remaining in the initial tank 112 is still greater than the predetermined threshold. Upon determining that the detected level of seeds remaining in the initial tank 112 is still greater than the predetermined threshold, the controller 170 may send an alarm signal to a user computing device, as described in greater detail herein.

With the batch of seeds positioned in the secondary tank 114, the batch of seeds may remain in the secondary tank 114 for a predetermined secondary time to continue to germinate the batch of seeds. Further, with the initial tank 112 vacated, the controller 170 may direct the tank outlet valve 116 to reposition from the open position to the closed position, and may direct the silo valve 104 to reposition from the closed position to the open position to release a second batch of dry seeds from the seed silo 103 to the initial tank 112.

As the batch of seeds resides in the secondary tank 114, water may be selectively moved to the secondary tank 114 and pumped out of the secondary tank 114 as described above with respect to FIGS. 5 and 6 to wet the batch of seeds and allow the batch of seeds to breathe.

Figure 7:
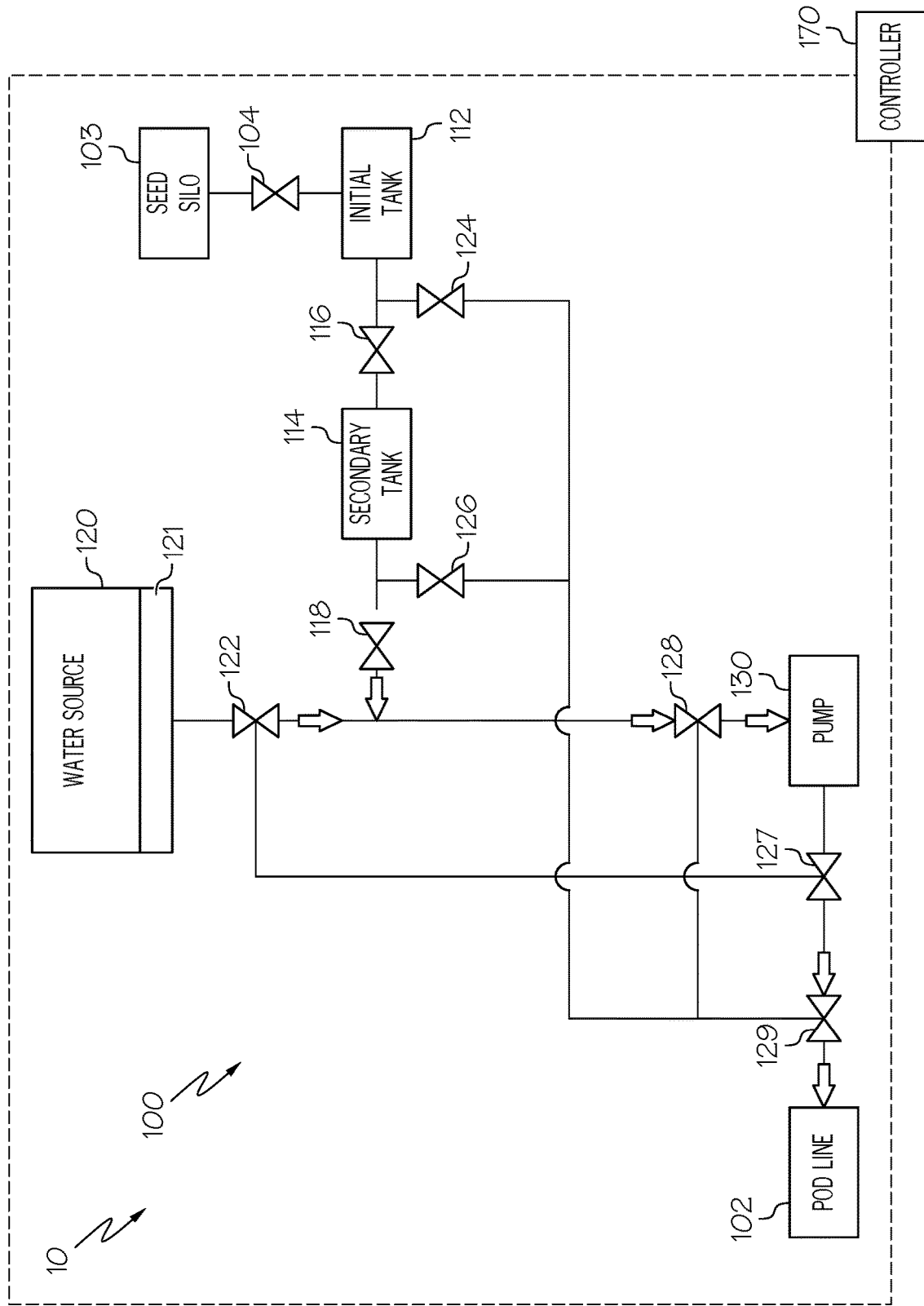
FIG. 7 schematically depicts the valve diagram of FIG. 4 pumping seeds from the secondary tank, according to one or more embodiments shown and described herein.

Once the batch of seeds has resided in the secondary tank 114 for the predetermined secondary time, the batch of seeds may be pumped to the pod line 102. In particular and referring to FIG. 7, once the batch of seeds has resided in the secondary tank 114 for the predetermined secondary time, in embodiments, the controller 170 directs the tank outlet valve 118 associated with the secondary tank 114 to reposition from the closed position to the open position. The controller 170 further directs the water source valve 122 and the pump inlet valve 128 to reposition from the closed position to the open position. With the water source valve 122, the pump inlet valve 128, and the tank outlet valve 118 associated with the secondary tank 114 in the open position, the secondary tank 114 and the water source 120 are in fluid communication with the pump 130.

With the secondary tank 114 and the water source 120 in fluid communication with the pump 130, the controller 170, in embodiments, directs the pump 130 move water and seed from the water source 120 and the secondary tank 114 to the pod line 102. In particular, in the embodiment depicted in FIG. 7, the controller 170 directs the pump outlet valve 127 and the pod line valve 129 to direct water and seed pumped by the pump 130 to the pod line 102.

In embodiments, it is generally desirable to maintain a minimum ratio of water to seeds passing through the pump 130. For example, in embodiments in which the pump 130 includes a centrifugal pump, the pump 130 may be selected such that individual seeds may pass between the impeller of the pump 130 and a housing of the pump 130 and/or between impeller blades of the pump 130. By maintaining a relatively high ratio of water to seeds passing through the pump 130, contact between the seeds and the impeller and/or housing of the pump 130 may be minimized, thereby reducing and/or minimizing damage to the seed as it passes through the pump 130. By contrast, if a comparatively low ratio of water to seeds passes through the pump 130, the seeds may contact the impeller and/or the housing of the pump 130, which may cause damage to the seeds and may in some instances render the seeds unusable. In embodiments, the ratio of water to seeds provided to the pump 130 from the secondary tank 114 and the water source 120 is about 4:1. In some embodiments, the ratio of water to seeds provided to the pump 130 from the secondary tank 114 and the water source 120 is about 5:1. In still other embodiments, the ratio of water to seeds provided to the pump 130 from the secondary tank 114 and the water source 120 is about 6:1.

In embodiments, the ratio of water to seeds provided to the pump 130 may be monitored and adjusted. For example, the tank level sensor 140 (FIG. 2) associated with the secondary tank 114 may detect a change in the level of the seeds released from the secondary tank 114, the level of seeds released correlating to a volume of seeds released from the secondary tank 114. The controller 170 is communicatively coupled to the tank level sensor 140 (FIG. 2) associated with the secondary tank 114, and may receive a signal from the tank level sensor 140 indicative of the volume of seeds released from the secondary tank 114. In embodiments, the controller 170 determines whether the volume of seeds released from the secondary tank 114 exceeds a predetermined threshold. In response to determining that the volume of seeds released from the secondary tank 114 is above the predetermined threshold, the controller 170 may direct one or more devices to increase a pressure of water at the water source 120. For example, the controller 170 may direct a valve in communication with the water source 120 and a water line connected to the water source 120 to move to an open position, increasing the volume of water in the water source 120, thereby increasing the pressure of the water at the water source 120. In response to determining that the volume of seeds released from the secondary tank 114 is below the predetermined threshold, the controller 170 may direct one or more devices to decrease a pressure of water at the water source 120. For example, the controller 170 may direct a valve in communication with the water source 120 to move to an open position, releasing water from the water source 120, thereby decreasing the pressure of the water at the water source 120.

Without being bound by theory, the ratio of water to seeds provided to the pump 130 by the water source 120 and the secondary tank 114 is influenced by the relative pressure of water at the water source 120 and the pressure of seeds at the secondary tank 114. More particularly, by decreasing the relative pressure of the water at the water source 120 in relation to the pressure of the seeds at the secondary tank 114 may increase the release of seeds from the secondary tank 114. By contrast, by increasing the relative pressure of water at the water source 120 in relation to the pressure of seeds at the secondary tank 114 may decrease the release of seed from the secondary tank 114. In this way, by selectively increasing or decreasing the pressure of water at the water source 120 based on the detected volume of seeds released from the secondary tank 114, the controller 170 may change the ratio of water to seeds that is provided to the pump 130.

Figure 8:
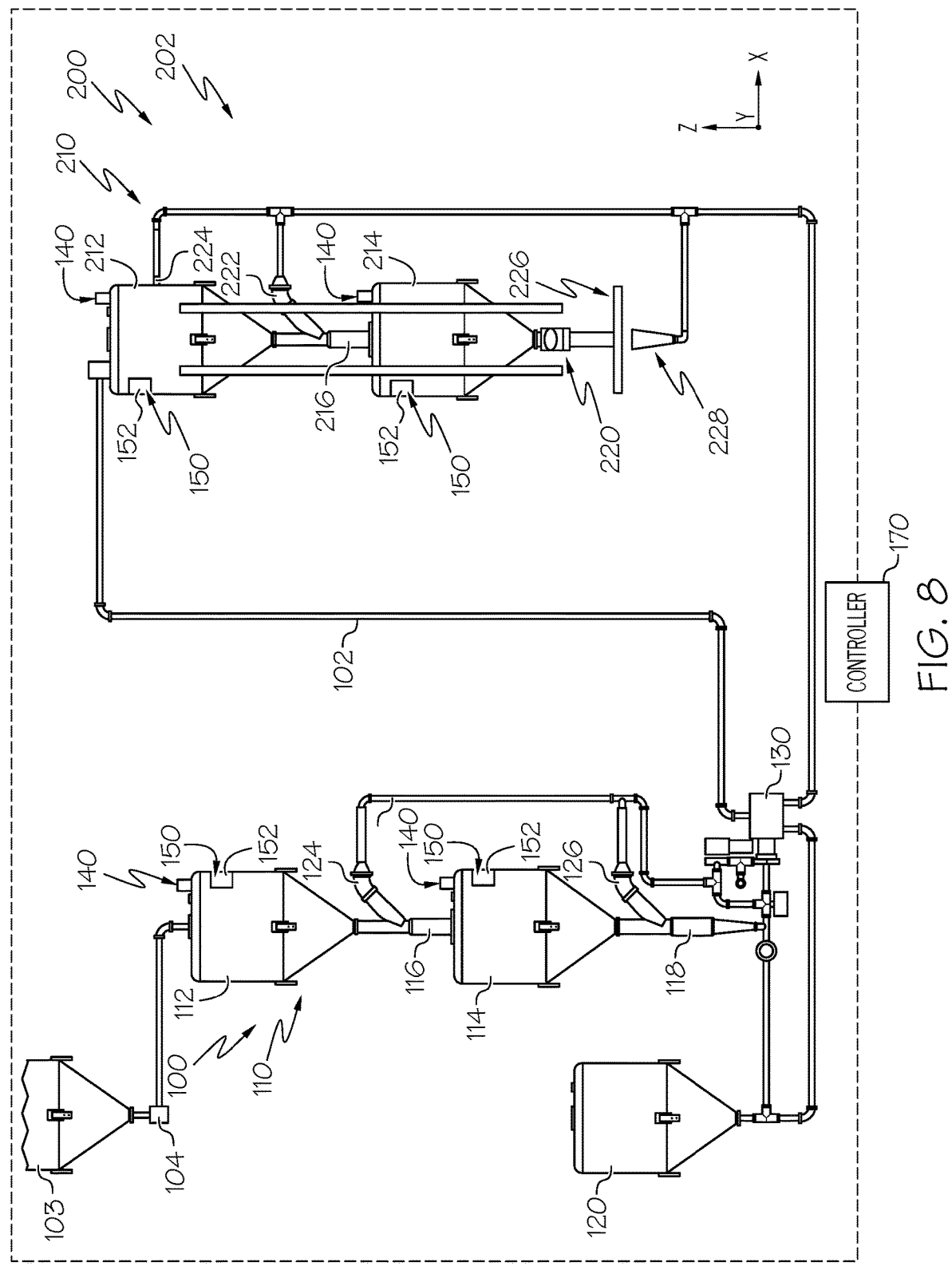
FIG. 8 schematically depicts the germination hub of FIG. 1 in fluid communication with a seeder assembly of an assembly line grow pod of FIG. 1, according to one or more embodiments shown and described herein.

The pump 130 may pump the seeds and water through the pod line 102 to one or more assembly line grow pods 200 (FIG. 1). More particularly and referring to FIG. 8, the pump 130 may pump the water and seeds through the pod line 102 to a seeder assembly 202 positioned at an assembly line grow pod 200. While the embodiment depicted in FIG. 8 shows the pump 130 in fluid communication with one seeder assembly 202 through the pod line 102, it should be understood that the pump 130 may be in fluid communication with multiple seeder assemblies 202. Moreover, while a single seeder assembly 202 of one of the assembly line grow pods 200 is schematically depicted, it should be understood that other assembly line grow pods 200 in fluid communication with germination hub 100 may be substantially the same.

The seeder assembly 202 generally includes one or more tanks 210 in fluid communication with the pod line 102. In the embodiment depicted in FIG. 8, the seeder assembly 202 generally includes a germination tank 212 that is in fluid communication with the pod line 102, and a seeder tank 214 that is in selective fluid communication with the germination tank 212. In embodiments, the germination tank 212 and the seeder tank 214 may be substantially similar to the initial tank 112 and the secondary tank 114 of the germination hub 100. In particular, the germination tank 212 and the seeder tank 214 may be formed of a suitable material to hold seed and water, such as stainless steel or the like. Additionally, the germination tank 212 and the seeder tank 214 may include associated tank level sensors 140 to detect the level of seed and/or water positioned within the germination tank 212 and the seeder tank 214. In some embodiments, the germination tank 212 and the seeder tank 214 further include associated agitation devices 150, such as associated vibration devices 152 and/or engagement members 154 (FIG. 3) positioned within the germination tank 212 and the seeder tank 214.

In embodiments, the germination tank 212 defines an upper portion and a lower portion positioned below the upper portion in a vertical direction. The germination tank 212 comprises a tank water valve 222 positioned at the lower portion of the germination tank 212 and the pump 130 is connected to the germination tank 212 through the tank water valve 222. Like the tank water valves 124, 126 of the germination hub 100, by positioning the tank water valve 222 at the lower portion of the germination tank 212, water introduced to the germination tank 212 through the tank water valve 222 may agitate seeds positioned within the germination tank 212.

In embodiments, the germination tank 212 further comprises a water outlet 224 positioned at the upper portion of the germination tank 212. The water outlet 224 is in fluid communication with the pump 130 and the water source 120. In embodiments, as water and seeds are moved to the germination tank 212 via the pod line 102 the seeds may generally settle to the lower portion of the germination tank 212. Excess water positioned within the germination tank 212 may flow out of the germination tank 212 via the water outlet 224.

In the embodiment depicted in FIG. 8, the seeder tank 214 is positioned below the germination tank 212 in the vertical direction. The germination tank 212 is connected to the seeder tank 214 through a tank outlet valve 216. The tank outlet valve 216 is repositionable between an open position, in which the germination tank 212 is in fluid communication with the seeder tank 214, and a closed position, in which the germination tank 212 is not in fluid communication with the seeder tank 214. In embodiments, the tank outlet valve 216 is communicatively coupled to the controller 170, which may selectively direct the tank outlet valve 216 to reposition between the open position and the closed position Like the tank outlet valve 116 between the initial tank 112 and the secondary tank 114, seed in the germination tank 212 may be moved to the seeder tank 214 by selectively opening the tank outlet valve 216.

As noted above, in embodiments, seeds and water are moved to the germination tank 212 via the pod line 102. The seeds remain in the germination tank 212 for a predetermined amount of time, and continue germinating. Similar to the initial tank 112 and the secondary tank 114 as described above with respect to FIGS. 5 and 6, the pump 130 may selectively direct water to and drain water from the germination tank 212 via the selective actuation of the pump 130 and the tank water valve 222.

Once the seeds have resided in the germination tank 212 for the predetermined amount of time, the controller 170 may direct the tank outlet valve 216 to release the seeds to the seeder tank 214.

In embodiments, the seeder assembly 202 includes a metering device 220 in fluid communication with the seeder tank 214. In embodiments, the metering device 220 is communicatively coupled to the controller 170 and may operate to controllably release the seeds from the seeder tank 214 to a gantry 226 positioned below the metering device 220. The metering device 220 may include any suitable device for releasing seeds from the seeder tank 214, for example and without limitation, a rotary vane pump or the like.

In the embodiment depicted in FIG. 8, the seeder assembly 202 includes a receptacle 228 positioned below the gantry 226 and the metering device 220. The receptacle 228 is in fluid communication with the water source 120 and may collect water runoff from the gantry 226 as seeds are deposited on the gantry 226.

Figure 9:
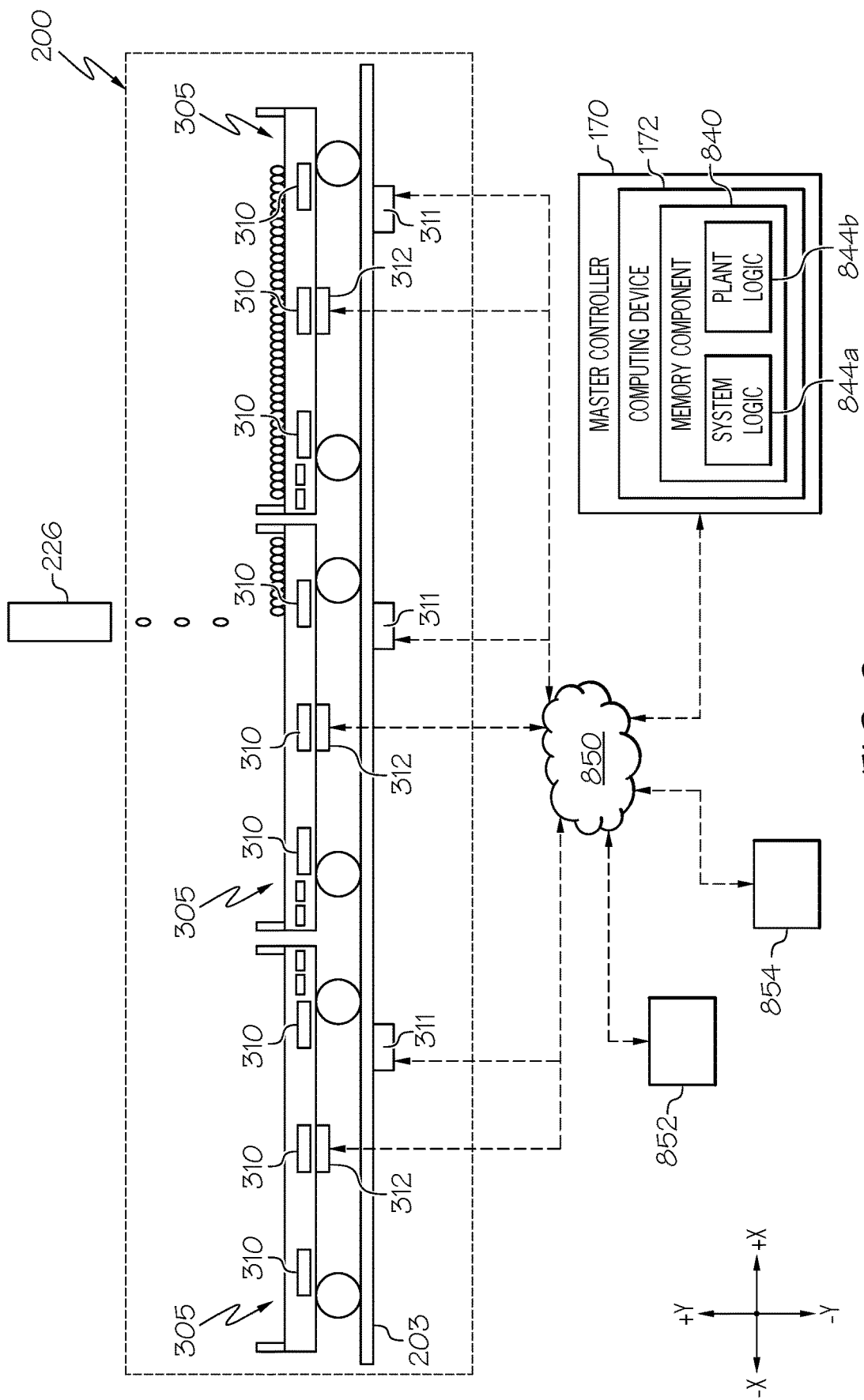
FIG. 9 schematically depicts a gantry of the seeder assembly of FIG. 8 positioned over carts of the assembly line grow pod, according to one or more embodiments shown and described herein.

Referring to FIG. 9, the gantry 226 is schematically depicted over a cart 305 of the assembly line grow pod 200. In embodiments, the gantry 226 and the metering device 220 (FIG. 8) are positioned over the cart or carts 305 of the assembly line grow pod 200. The gantry 226 is configured dispense seeds to one or more carts 305 as the carts 305 pass through a seeding region of the assembly line grow pod 200. While a single assembly line grow pod 200 is schematically depicted in FIG. 9, it should be understood that all of the assembly line grow pods 200 in fluid communication with the germination hub 100 may be substantially the same and may include carts 305 including substantially the same features.

In some embodiments, each of the carts 305 includes a single section tray for receiving a plurality of seeds. In other embodiments one or more of the carts 305 may include a multiple section tray for receiving individual seeds in each section. In the embodiments with a single section tray, upon a cart 305 entering the seeding region, the gantry 226 may begin laying seed across an area of the single section tray. The seeds may be laid out according to various criteria, such as a desired depth of seed, a desired number of seeds, a desired surface area of seeds, or the like. In the embodiments where a multiple section tray is utilized with one or more of the carts 305, the gantry 226 may be configured to individually insert seeds into one or more of the sections of the tray. Again, the seeds may be distributed on the tray according to a desired number of seeds, a desired area the seeds should cover, a desired depth of seeds, etc.

As depicted in FIG. 9, a plurality of carts 305 is depicted moving through the seeding region. The carts 305 include weight sensors 310 that are configured to detect a weight of seeds held within the trays of the carts 305. In the embodiment depicted in FIG. 9, the weight sensors 310 are positioned in the trays of the separate carts 305, and each of the carts 305 include multiple weight sensors 310. In embodiments in which the carts 305 include multiple weight sensors 310, the weight sensors 310 may be positioned at different positions within the tray, such that each of the weight sensors 310 may detect the weight of seeds at different positions within the tray. In some applications, it may be desirable to grow different types of plant matter within a single tray, such as in instances where the trays include different and discrete sections. In these applications, the different weight sensors 310 may be configured to detect the weights of the different types of plant matter at different positions within the tray. While the embodiment depicted in FIG. 9 shows carts 305 including multiple weight sensors 310, it should be understood that each of the carts 305 may include a single weight sensor 310, or may optionally not include any weight sensors 310.

In some embodiments, each of the carts 305 further includes a cart computing device 312. The cart computing devices 312 may be communicatively coupled to the weight sensors 310 and are configured to receive signals indicative of a detected weight from the weight sensors 310. The cart computing devices 312 may also be communicatively coupled to the controller 170 through a network 850.

In some embodiments, one or more weight sensors 311 may be placed on or beneath the track 203. The weight sensors 311 are configured to measure the weights of the carts 305 on the track 203 and transmit signals indicative of a detected weight to the controller 170. In embodiments, the controller 170 may determine the weight of seeds on a cart 305 based on a detected weight from the weight sensors 311 and a known weight of the cart 305 (i.e., the weight of the cart 305 without plant matter).

Referring collectively to FIGS. 8 and 9, in embodiments, the weight sensors 311, the weight sensors 310, the metering device 220, and or a tank level sensor 140 associated with the seeder tank 214 may monitor the amount of seeds released from the seeder tank 214. In operation, the metering device 220 controllably releases seeds to the gantry 226 for deposition within a tray of a cart 305, such that a predetermined amount of seeds are deposited within each cart 305. As the metering device 220 releases seeds from the seeder tank 214, a tank level sensor 140 associated with the seeder tank 214 may detect the amount of seed leaving the seeder tank 214. If the rate of change of the level of seed in the seeder tank 214 exceeds a predetermined desired rate, the controller 170 may direct the metering device 220 to slow the rate of the release of seeds from the seeder tank 214. If the rate of change of the level of seed in the seeder tank 214 is below the predetermined desired rate, the controller 170 may direct the metering device 220 to increase the rate of the release of seeds from the seeder tank 214. In some embodiments, the controller 170 may direct the metering device 220 to cease releasing seed to the gantry 226, for example, in response to detecting that the volume of seeds released from the seeder tank 214 exceeds the desired amount of seeds in the cart 305.

In embodiments, the weight sensors 311 in the track 203 and/or the weight sensors 310 in the carts 305 may detect the weight of seeds deposited in the cart 305 and the controller 170 may direct the metering device 220 to increase or decrease the release of seeds from the seeder tank 214 in response to a detected weight of seed within the cart 305 from the weight sensors 311 in the track 203 and/or the weight sensors 310 of the carts 305.

In this way, the release of seeds from the seeder tank 214 may be selectively increased or decreased to ensure that the predetermined amount of seeds is deposited within each cart 305. In some embodiments, the release of seeds from the seeder tank 214 may be selectively increased or decreased to ensure that the seeder tank 214 is emptied within a predetermined amount of time. For example, to ensure that seeds within the seeder tank 214 and the germination tank 212 germinate for an appropriate amount of time and do not over or under germinate before deposition into the carts 305, it is desirable to vacate the seeder tank 214 within a predetermined amount of time so that seeds from the germination tank 212 may be moved to the seeder tank 214 for deposition into the carts 305. Accordingly, in some embodiments, the controller 170 may direct the metering device 220 to increase or decrease the release of seeds from the seeder tank 214 in response to determining that the seeder tank 214 will not be emptied at the predetermined amount of time based on the detected rate of change of the volume of seed in the seeder tank 214 as detected by the tank level sensor 140. Similarly, in some embodiments, the controller 170 may direct the metering device 220 to increase or decrease the release of seeds from the seeder tank 214 in response to determining that the seeder tank 214 will not be emptied at the predetermined amount of time based on the detected weight of seed deposited in the carts 305 as detected by the weight sensors 311 in the track 203 and/or the weight sensors 310 in the carts 305.

The controller 170 may include a computing device 172. The computing device 172 may include a memory component 840, which stores systems logic 844a and plant logic 844b. As described in more detail below, the systems logic 844a may monitor and control operations of one or more of the components of the assembly line grow pod 200 and/or the germination hub 100 (FIG. 2). The plant logic 844b may be configured to determine and/or receive a stored recipe for plant growth and may facilitate implementation of the recipe via the systems logic 844a. The controller 170 is coupled to a network 850. The network 850 may include the internet or other wide area network, a local network, such as a local area network, a near field network, such as Bluetooth or a near field communication (NFC) network. The network 850 is also coupled to a user computing device 852 and/or a remote computing device 854. The user computing device 852 may include a personal computer, laptop, mobile device, tablet, phablet, mobile device, or the like and may be utilized as an interface with a user. As an example, a detected weight of seeds within each of the carts 305 may be transmitted to the user computing device 852, and a display of the user computing device 852 may display the weight for each of the carts 305. The user computing device 852 may also receive input from a user, for example, the user computing device 852 may receive an input indicative of a type of seeds to be placed in the carts 305 by the gantry 226.

Similarly, the remote computing device 854 may include a server, personal computer, tablet, phablet, mobile device, server, or the like, and may be utilized for machine to machine communications. As an example, if the controller 170 determines a type of seeds being used (and/or other information, such as ambient conditions), the controller 170 may communicate with the remote computing device 854 to retrieve a previously stored recipe (i.e., predetermined preferred growing conditions, such as water/nutrient requirements, lighting requirements, temperature requirements, humidity requirements, or the like). As such, some embodiments may utilize an application program interface (API) to facilitate this or other computer-to-computer communications.

Figure 10:
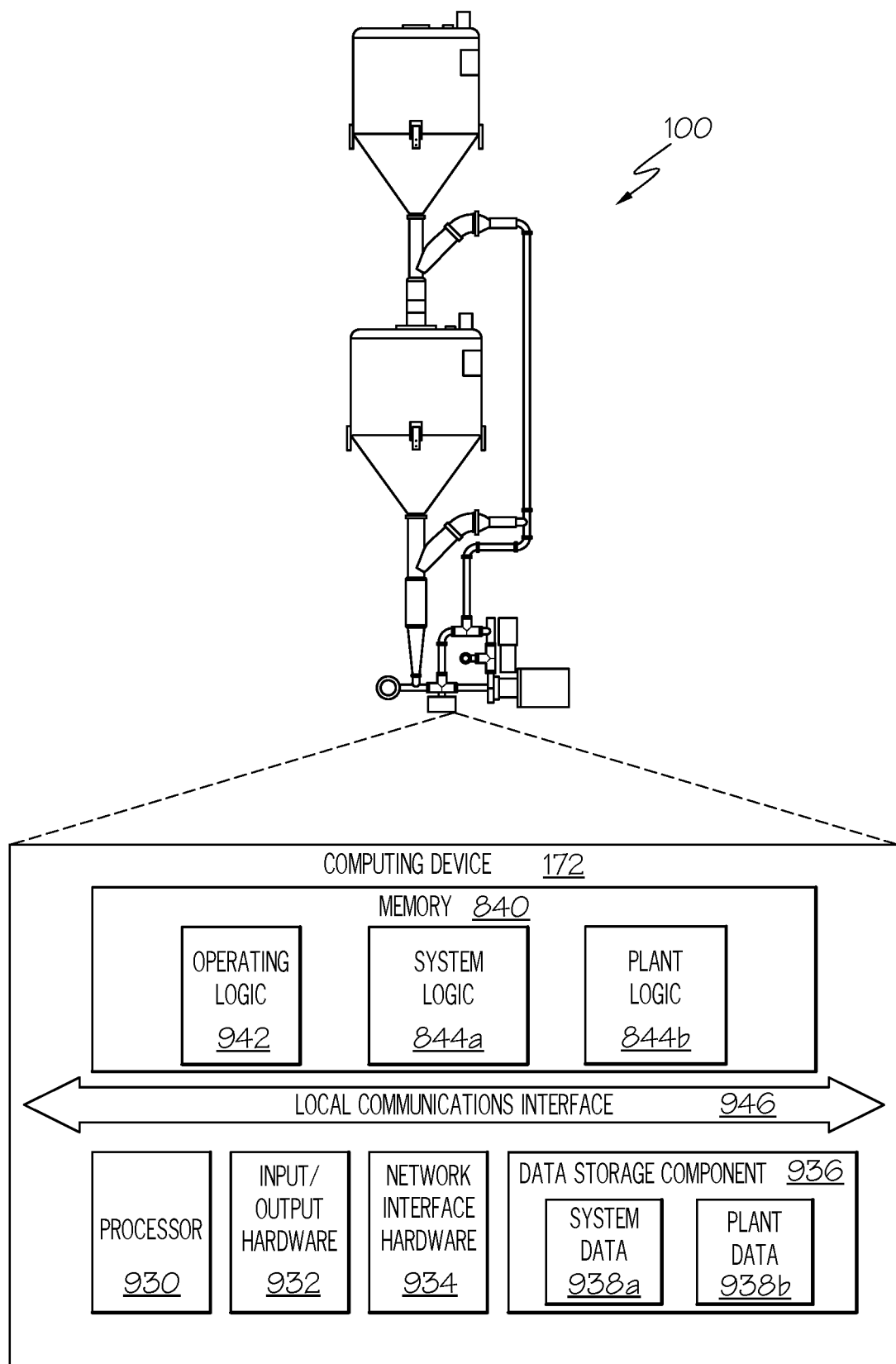
FIG. 10 schematically a computing device of a controller of the germination hub and the seeder assembly of FIG. 9, according to one or more embodiments shown and described herein.
Figure 11:
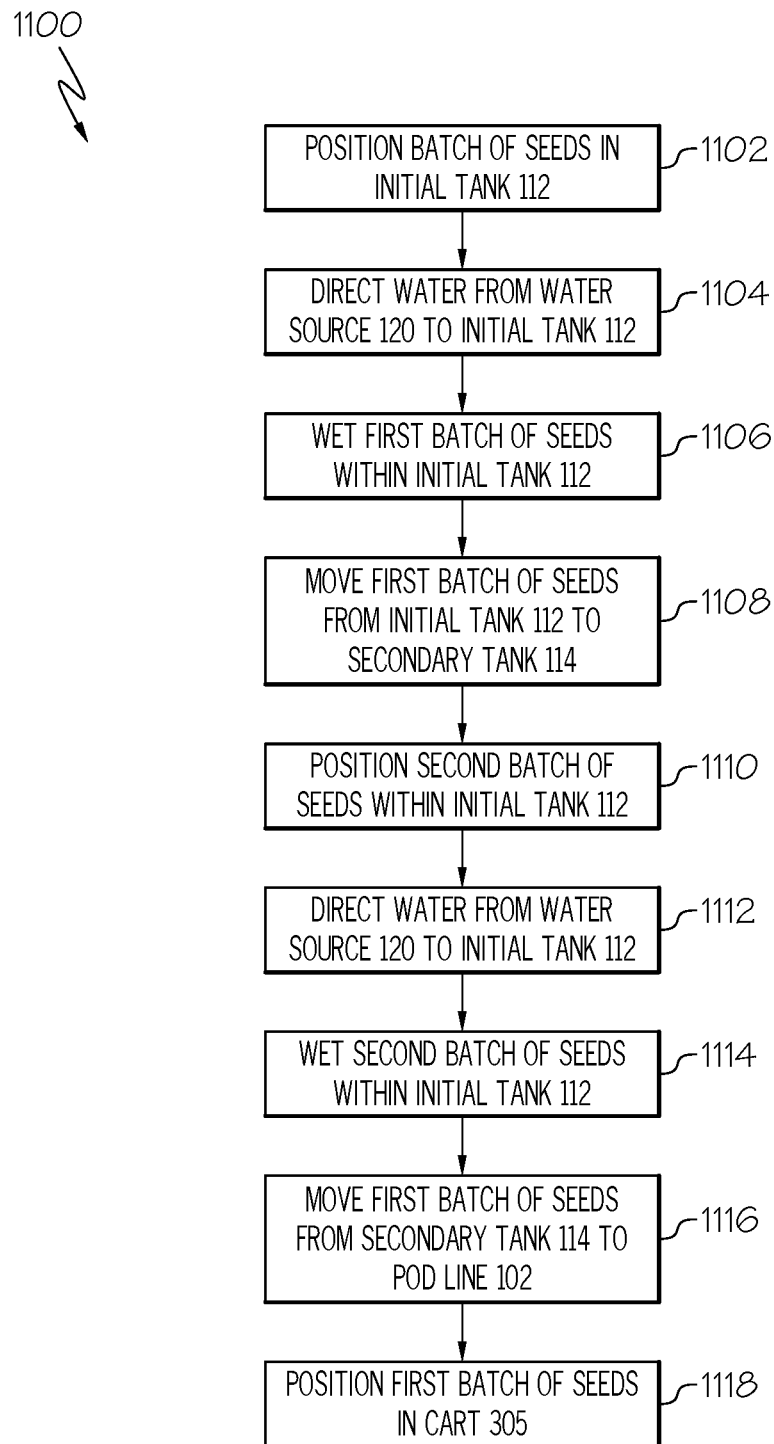
FIG. 11 schematically depicts a flowchart of an example method for germinating a seed within the germination hub of FIG. 1, according to one or more embodiments shown and described herein.
Figure 12:
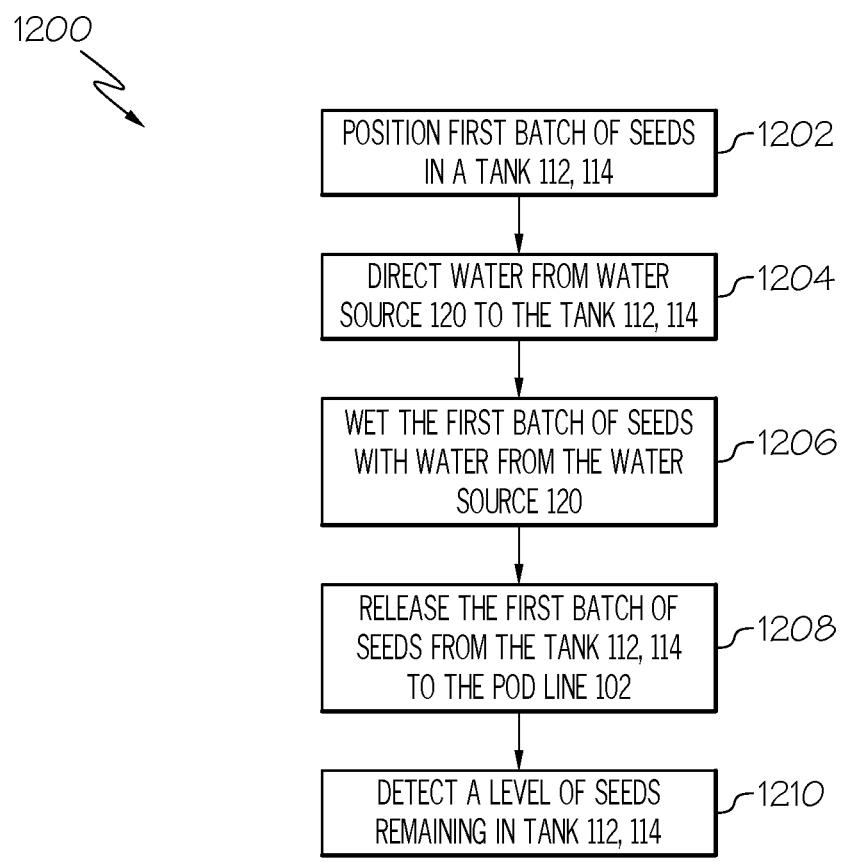
FIG. 12 schematically depicts a flowchart of an example method for managing the movement of wetted seeds from a tank is schematically depicted, according to one or more embodiments shown and described herein.
Figure 13:
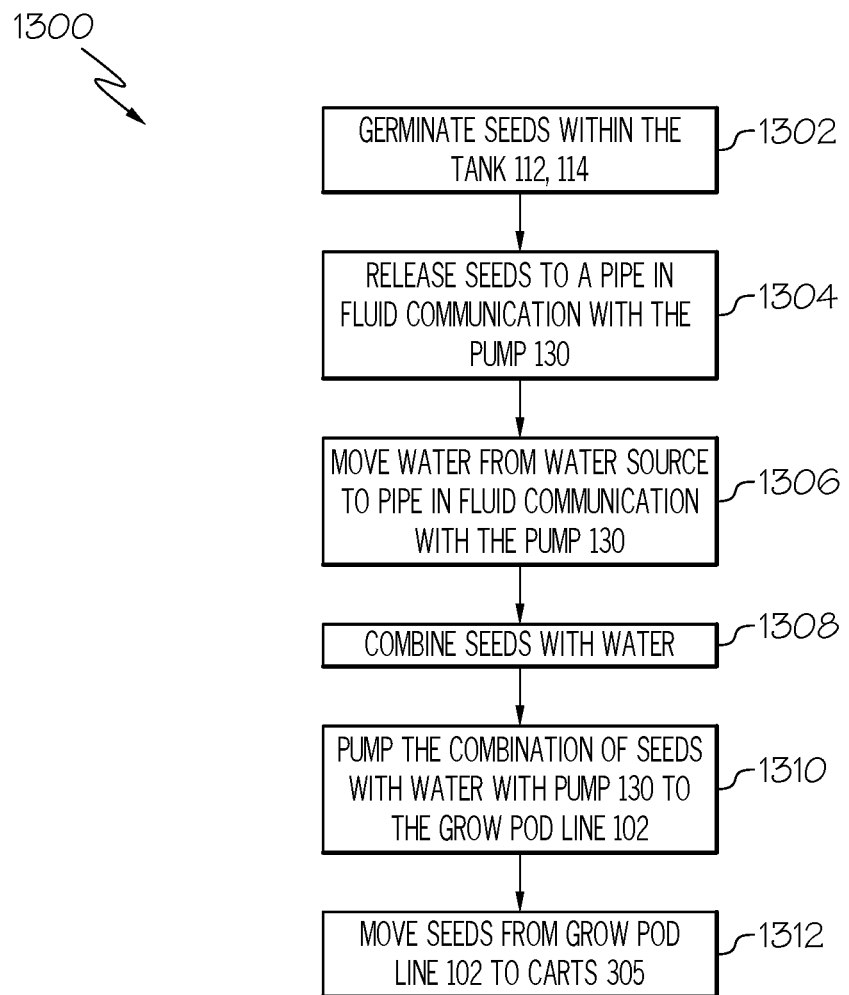
FIG. 13 schematically depicts a flowchart of an example method for moving wetted seeds is schematically depicted, according to one or more embodiments shown and described herein.

FIG. 10 depicts the computing device 172 of the controller 170, according to embodiments described herein. As illustrated, the computing device 172 includes a processor 930, input/output hardware 932, the network interface hardware 934, a data storage component 936 (which stores systems data 938a, plant data 938b, and/or other data), and the memory component 840. The memory component 840 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), bernoulli cartridges, and/or other types of non-transitory computer-readable mediums. Depending on the particular embodiment, these non-transitory computer-readable mediums may reside within the computing device 172 and/or external to the computing device 172.

The memory component 840 may store operating logic 942, the systems logic 844a, and the plant logic 844b. The systems logic 844a and the plant logic 844b may each include a plurality of different pieces of logic, each of which may be embodied as a computer program, firmware, and/or hardware, as an example. The computing device 172 further includes a local interface 946 that may be implemented as a bus or other communication interface to facilitate communication among the components of the computing device 172.

The processor 930 may include any processing component operable to receive and execute instructions (such as from a data storage component 936 and/or the memory component 840). The input/output hardware 932 may include and/or be configured to interface with microphones, speakers, a display, and/or other hardware.

The network interface hardware 934 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the computing device 172 and other computing devices, such as the user computing device 852 and/or remote computing device 854.

The operating logic 942 may include an operating system and/or other software for managing components of the computing device 172. As also discussed above, systems logic 844a and the plant logic 844b may reside in the memory component 840 and may be configured to perform the functionality, as described herein.

It should be understood that while the components in FIG. 10 are illustrated as residing within the computing device 172, this is merely an example. In some embodiments, one or more of the components may reside external to the computing device 172. It should also be understood that, while the computing device 172 is illustrated as a single device, this is also merely an example. In some embodiments, the systems logic 844a and the plant logic 844b may reside on different computing devices. As an example, one or more of the functionalities and/or components described herein may be provided by the user computing device 852 and/or remote computing device 854.

Additionally, while the computing device 172 is illustrated with the systems logic 844a and the plant logic 844b as separate logical components, this is also an example. In some embodiments, a single piece of logic (and/or or several linked modules) may cause the computing device 172 to provide the described functionality.

Referring collectively to FIGS. 4, 8, 9, and 11, a method for germinating seeds is schematically depicted. In a first block 1102, a first batch of seeds is positioned within the initial tank 112. At block 1104, water from the water source 120 is directed to the initial tank 112. At block 1106, the first batch of seeds is wetted within the initial tank 112 with the water from the water source 120, initiating germination of the first batch of seeds. At block 1108, the first batch of seeds are moved from the initial tank 112 to the secondary tank 114 in fluid communication with the initial tank 112 after a predetermined initial time. At block 1110, subsequent to moving the first batch of seeds from the initial tank 112, a second batch of seeds are positioned within the initial tank 112. At block 1112 water from the water source 120 is directed to the initial tank 112. At block 1114, the second batch of seeds within the initial tank 112 are wetted with the water from the water source 120, initiating germination of the second batch of seeds. At block 1116, the first batch of seeds from the secondary tank 114 are moved to the pod line 102 that is in fluid communication with an assembly line grow pod 200 after a predetermined secondary time. At block 1118, the first batch of seeds is positioned in one or more carts 305 of the assembly line grow pod 200.

As described above, blocks 1102-1118 may be performed by the controller 170 in conjunction with components communicatively coupled to the controller 170.

Referring collectively to FIGS. 4, 8, 9, and 12, a method for managing the movement of wetted seeds from a tank is schematically depicted. In a first block 1202, a first batch of seeds is positioned within a tank (the initial tank 112 or the secondary tank 114). At block 1204, water from a water source 120 is directed to the tank 112, 114. At block 1206, the first batch of seeds within the tank 112, 114 is wetted with the water from the water source 120, initiating germination of the first batch of seeds. At block 1206, the first batch of seeds is released from the tank 112, 114 to a pod line 102 in fluid communication with an assembly line grow pod 200 after a predetermined tie. At block 1210, subsequent to releasing the first batch of seeds from the tank 112, 114, a level of seeds remaining in the tank 112, 114 is detected. As described above, blocks 1202-1210 may be performed by the controller 170 in conjunction with components communicatively coupled to the controller 170.

Referring collectively to FIGS. 4, 8, 9, and 13, a method for moving wetted seeds is schematically depicted. In a first block 1302, seeds are germinated within a tank (the initial tank 112 or the secondary tank 114). At block 1304, the seeds from the tank 112, 114 are released to a pipe in fluid communication with the tank 112, 114 and in fluid communication with the pump 130. At block 1306, water from the water source 120 is moved to the pipe in fluid communication with the pump 130. At block 1308, the seeds released from the tank 112, 114 are combined with the water from the water source 120 in the pipe. At block 1310, the combination of the seeds released from the tank 112, 114 and the water from the water source 120 are pumped to the grow pod line 102 in fluid communication with the pump 130. At block 1312, the seeds from the grow pod line 102 are moved to one or more carts 305 of the assembly line grow pod 200. As described above, blocks 1202-1210 may be performed by the controller 170 in conjunction with components communicatively coupled to the controller 170.

It should be now understood that embodiments described herein are directed to systems and methods for germinating seeds for assembly line grow pods. By initiating the germination process at a germination hub, the time required to produce mature plants at the assembly line grow pod may be reduced.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for pumping seeds to an assembly line grow pod, the method comprising:
   releasing seeds to a pipe in fluid communication with a pump;
   moving water from a water source to the pipe in fluid communication with the pump;
   combining the seeds released from the tank with the water from the water source in the pipe; and
   passing the combination of seed released from the tank and the water released from the water source through the pump, thereby pumping the combination of the seeds released from the tank and the water from the water source to a grow pod line in fluid communication with the pump; and
   moving the seeds from the grow pod line to one or more carts of an assembly line grow pod.

2. The method of claim 1, further comprising, subsequent to pumping the combination of seeds and the water from the water source, positioning the seeds and the water in a tank at the assembly line grow pod.

3. The method of claim 2, further comprising draining excess water from the tank at the assembly line grow pod.

4. The method of claim 3, wherein draining the excess water from the tank at the assembly line grow pod comprises draining the excess water through a water outlet positioned at an upper portion of the tank.

5. The method of claim 1, further comprising:
   detecting a volume of seeds released to the pipe;
   determining whether the volume of seeds released to the pipe is above a predetermined threshold;

in response to determining that the volume of seeds released to the pipe is above the predetermined threshold, increasing a pressure of water at the water source.

6. The method of claim 1, further comprising:
detecting a volume of seeds released from a tank;
determining whether the volume of seeds released from the tank is below a predetermined threshold;
in response to determining that the volume of seeds released from the tank is below the predetermined threshold, decreasing a pressure of water at the water source.

7. The method of claim 1, wherein the combination of seeds and the water from the water source comprises a ratio of about at least 4 parts water to about 1 part seed by volume.

8. A method for moving germinated seeds to an assembly line grow pod, the method comprising:
germinating seeds within a tank at a germination hub;
releasing the seeds from the tank to a pipe in fluid communication with the tank and in fluid communication with a pump;
moving water from a water source to the pipe in fluid communication with the pump;
combining the seeds released from the tank with the water from the water source in the pipe;
passing the combination of seed released from the tank and the water released from the water source through the pump, thereby pumping the combination of the seeds released from the tank and the water from the water source to a grow pod line in fluid communication with the pump; and
moving the seeds from the grow pod line to one or more carts of an assembly line grow pod.

9. The method of claim 8, further comprising, subsequent to pumping the combination of seeds released from the tank at the germination hub and the water from the water source, positioning the seeds and the water from the water source in a tank at the assembly line grow pod.

10. The method of claim 9, further comprising draining excess water from the tank at the assembly line grow pod.

11. The method of claim 10, wherein draining the excess water from the tank at the assembly line grow pod comprises draining the excess water through a water outlet positioned at an upper portion of the tank at the assembly line grow pod.

12. The method of claim 8, further comprising:
detecting a volume of seeds released from the tank;
determining whether the volume of seeds released from the tank is above a predetermined threshold;
in response to determining that the volume of seeds released from the tank is above the predetermined threshold, increasing a pressure of water at the water source.

13. The method of claim 8, further comprising:
detecting a volume of seeds released from the tank;
determining whether the volume of seeds released from the tank is below a predetermined threshold;
in response to determining that the volume of seeds released from the tank is below the predetermined threshold, decreasing a pressure of water at the water source.

14. The method of claim 8, wherein germinating the seeds within the tank comprises directing water from the water source to the tank and wetting the seeds.

15. The method of claim 8, wherein germinating the seeds comprises retaining the seeds within the tank subsequent to wetting the seeds and prior to releasing the seeds to the pipe.

16. The method of claim 8, wherein the combination of seeds released from the tank and the water from the water source comprises a ratio of at least about 4 parts water to 1 part seed by volume.

17. A system for an assembly line grow pod, the system comprising:
a germination hub comprising:
a tank;
a tank water valve in fluid communication with the tank, wherein the tank water valve is repositionable between a closed position and an open position;
a water source in selective fluid communication with the tank through the tank water valve;
a pump in selective fluid communication with the tank and the water source;
a water source valve positioned between the pump and the water source, wherein the water source valve is repositionable between an open position and a closed position; and
a tank outlet valve positioned between the tank and the pump, wherein the tank outlet valve is repositionable between an open position and a closed position;
a pod line in selective fluid communication with the germination hub; and
a controller communicatively coupled to the tank water valve, the pump, the water source valve, and the tank outlet valve, the controller comprising a processor and a computer readable and executable instruction set, which when executed, causes the processor to:
direct the tank water valve to move from the closed position to the open position;
direct the pump to move water from the water source to the tank through the tank water valve, wetting a first batch of seeds within the tank with the water from the water source, initiating germination of the first batch of seeds;
after a predetermined time, direct the tank outlet valve to move from the closed position to the open position, releasing the first batch of seeds from the tank to pass the combination of seed released from the tank and the water released from the water source through the pump;
direct the water source valve to move from the closed position, releasing water from the water source to the pump; and
direct the pump to move the first batch of seeds to the pod line and the water from the water source to the pod line.

18. The system of claim 17, further comprising a tank level sensor communicatively coupled to the controller, and wherein the executable instruction set, when executed, further causes the processor to:
receive a signal from the tank level sensor indicative of a volume of seeds released from the tank;
determine whether the volume of seeds released from the tank is above a predetermined threshold;
in response to determining that the volume of seeds released from the tank is above the predetermined threshold, direct the water source to increase a pressure of water at the water source.

19. The system of claim 17, further comprising a tank level sensor communicatively coupled to the controller, and wherein the executable instruction set, when executed, further causes the processor to:
receive a signal from the tank level sensor indicative of a volume of seeds released from the tank;

determine whether the volume of seeds released from the tank is above a predetermined threshold;

in response to determining that the volume of seeds released from the tank is below the predetermined threshold, release water from the water source to decrease a pressure of water at the water source.

20. The system of claim 17, wherein the combination of seeds released from the tank and the water from the water source comprises a ratio of at least about 4 parts water to 1 part seed by volume.

* * * * *